US009383982B2

(12) United States Patent
Zhang et al.

(10) Patent No.: US 9,383,982 B2
(45) Date of Patent: Jul. 5, 2016

(54) DATA-PARALLEL COMPUTATION MANAGEMENT

(75) Inventors: Jiaxing Zhang, Beijing (CN); Hucheng Zhou, Beijing (CN); Zhenyu Guo, Beijing (CN); Haoxiang Lin, Beijing (CN); Lidong Zhou, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 500 days.

(21) Appl. No.: 13/612,184

(22) Filed: Sep. 12, 2012

(65) Prior Publication Data

US 2014/0075161 A1    Mar. 13, 2014

(51) Int. Cl.
*G06F 9/38* (2006.01)
*G06F 9/45* (2006.01)

(52) U.S. Cl.
CPC ........ *G06F 8/453* (2013.01); *G06F 2209/5017* (2013.01)

(58) Field of Classification Search
CPC ............... G06F 17/30448; G06F 17/30463; G06F 2209/5017; G06F 8/453
USPC ................................................. 707/713, 718
See application file for complete search history.

(56) References Cited

U.S. PATENT DOCUMENTS

| 6,112,198 | A | 8/2000 | Lohman et al. | |
|---|---|---|---|---|
| 7,577,637 | B2 | 8/2009 | Ghosh | |
| 8,510,538 | B1* | 8/2013 | Malewicz et al. | 712/225 |
| 2007/0089105 | A1* | 4/2007 | Archambault | G06F 8/443 717/151 |
| 2007/0174829 | A1* | 7/2007 | Brockmeyer | G06F 8/453 717/151 |
| 2008/0059440 | A1 | 3/2008 | Barsness et al. | |
| 2008/0141279 | A1* | 6/2008 | Mattson | G06F 8/453 719/313 |
| 2008/0201721 | A1* | 8/2008 | Little | G06F 9/5027 718/106 |
| 2009/0112792 | A1 | 4/2009 | Barsness et al. | |
| 2010/0218196 | A1* | 8/2010 | Leung | G06F 8/453 718/107 |
| 2012/0078951 | A1* | 3/2012 | Hsu | G06F 17/30445 707/769 |
| 2012/0331088 | A1* | 12/2012 | O'Hare | G06F 21/6227 709/214 |
| 2013/0124466 | A1* | 5/2013 | Naidu | G06F 17/30575 707/610 |
| 2014/0006383 | A1* | 1/2014 | Hacigumus et al. | 707/718 |

OTHER PUBLICATIONS

He et al., "Comet: Batched Stream Processing for Data Intensive Distributed Computing," In Proceedings of the ACM Synmposium on Cloud Computing, Jun. 10, 2010, 12 pages.
Herodotou et al., "Profiling, What-if Analysis, and Cost-based Optimization of MapReduce Programs," In Proceedings of the VLDB Endowment, vol. 4, No. 11, Aug. 29, 2011, pp. 1111-1122.
Jahani et al., "Automatic Optimization for MapReduce Programs," In Proceedings of the VLDB Endowment, vol. 4, No. 6, Aug. 29, 2011, pp. 385-396.
Olston et al., "Automatic Optimization of Parallel Dataflow Programs," In Proceedings Annual Technical Conference on Annual Technical Conference, Jun. 22, 2008, pp. 267-273.
Wang et al., "CoScan: Cooperative Scan Sharing in the Cloud," In Proceedings of the Symposium on Cloud Computing, Oct. 27, 2011, 12 pages.

(Continued)

*Primary Examiner* — Huawen Peng
(74) *Attorney, Agent, or Firm* — Steve Wight; Sandy Swain; Micky Minhas

(57) ABSTRACT

Data-parallel computation programs may be improved by, for example, determining the functional properties user defined functions (UDFs), eliminating unnecessary data-shuffling stages, and/or changing data-partition properties to cause desired data properties to appear after one or more user defined functions are applied.

19 Claims, 17 Drawing Sheets

(56) References Cited

OTHER PUBLICATIONS

Zhang et al, "Optimizing Data Shuffling in Data Parallel Computation by Understanding User Defined Functions," 9th Usenix Symposium on Networked Systems Design and Implementation, Apr. 2012, 14 pages.

Zhou et al, "Incorporating Partitioning and Parallel Plans into the SCOPE Optimizer," 26th IEEE Intl Conf on Data Engineering, Mar. 2010, 12 pages.

* cited by examiner

| Cross-partition \ Within-partition | None | Contiguous | Sorted |
|---|---|---|---|
| None | AdHoc | - | LSorted |
| Partitioned | Disjoint | Clustered | PSorted |
| Ranged | - | - | GSorted |

Table 1: Illustrative data-partition properties

Fig. 1

```
1  PassThrough(t, t)
2
3  _(y, t) :- ASSIGN y x,   _(x, t)
4  StInc(z, t) :- ADD z x y,  StInc(x, t),  Inc(y, t)
5  StInc(z, t) :- ADD z x y,  Inc(x, t),   StInc(y, t)
6
7  One2One(y, t) :- MD5 y x,   One2One(x, t)
8
9  StInc(x, t) :- PassThrough(x, t)
10 One2One(x, t), Inc(x, t) :- StInc(x, t)
11 One2One(x, t), Dec(x, t) :- StDec(x, t)
12 Func(x, t) :- _(x, t)
13 Inc(x, _), Dec(x, _) :- Constant(x)
```

Fig. 6 procedure OnVisitVertex(*v*)
    *v.WPrecondition AdHoc*
    if *v.Type = UDF* then
        if *v.UDF = Reducer* then
            *v.WPrecondition Clustered*
        else if *v.UDF = Merger* then
            *v.WPrecondition PSorted*
        end if
    else if *v.IsOutputVertex* then
        *v.WPrecondition v.GetOutputDataProperty()*
    else
        *v.WPostcondition v.OutVertices.Select(ov ≥ ov.WPrecondition).Max()*
    end if
end procedure

Fig. 7

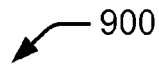

```
procedure ForwardExplorer (currGraph, traverseSuffix)
    while traverseSuffix.IsNotEmpty() do
        v traverseSuffix.RemoveFirst()
        if v.InVertices.Count = 0 then
            inputDP v.Input.GetDataProperty()
        else if v.InVertices.Count = 1 then
            inputDP v.InVertices[0].CurrentPostDP
        else
            if !v.ValidateMerge() then
                return
            end if
            inputDP v.InVertices[0].CurrentPostDP
        end if
        if v.Type = UDF then
            v.CurrentPostDP DPPropertyTransition(inputDP,funcProperty)
        else
            for prop in {p|p ≥ v.WPostcondition} do
                v.CurrentPostDP prop
                v.SSteps GetShufflingSteps(inputDP,prop)
                ForwardExplorer(currGraph, traverseSuffix)
            end for
        end if
    end while
    Plans.Add(currGraph)
end procedure
```

Fig. 9

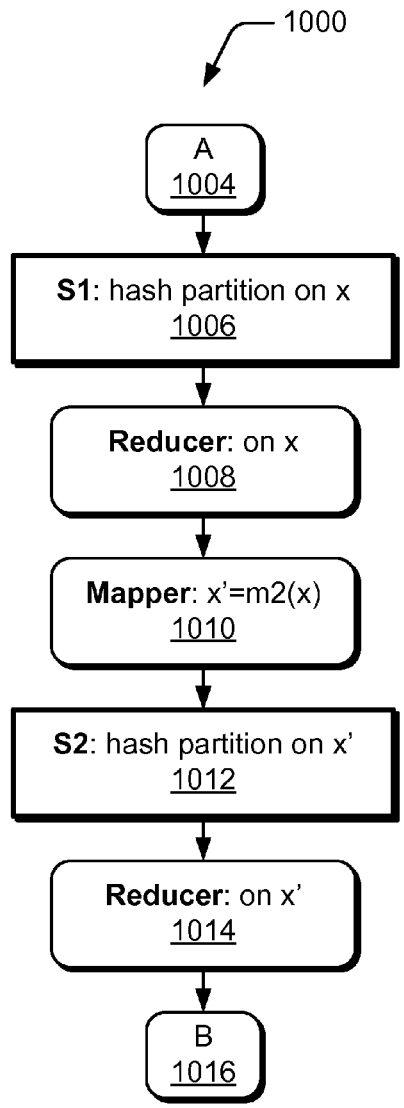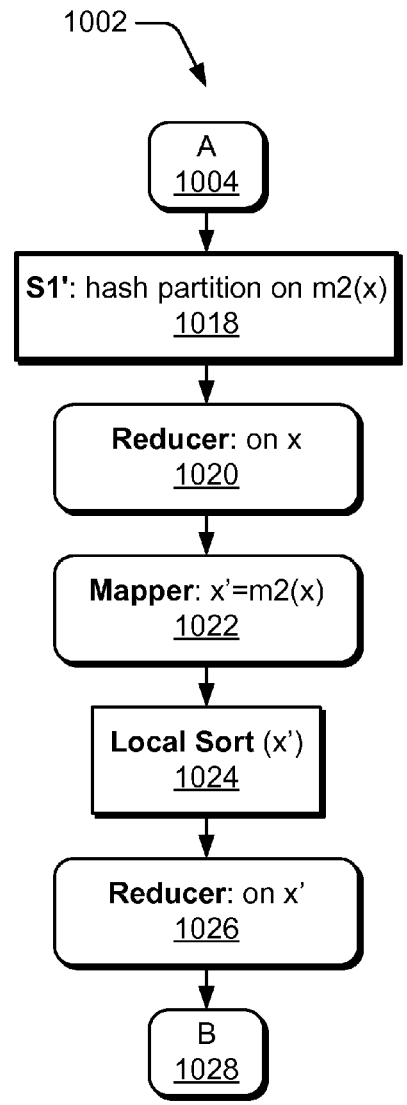
Fig. 10a
Fig. 10b

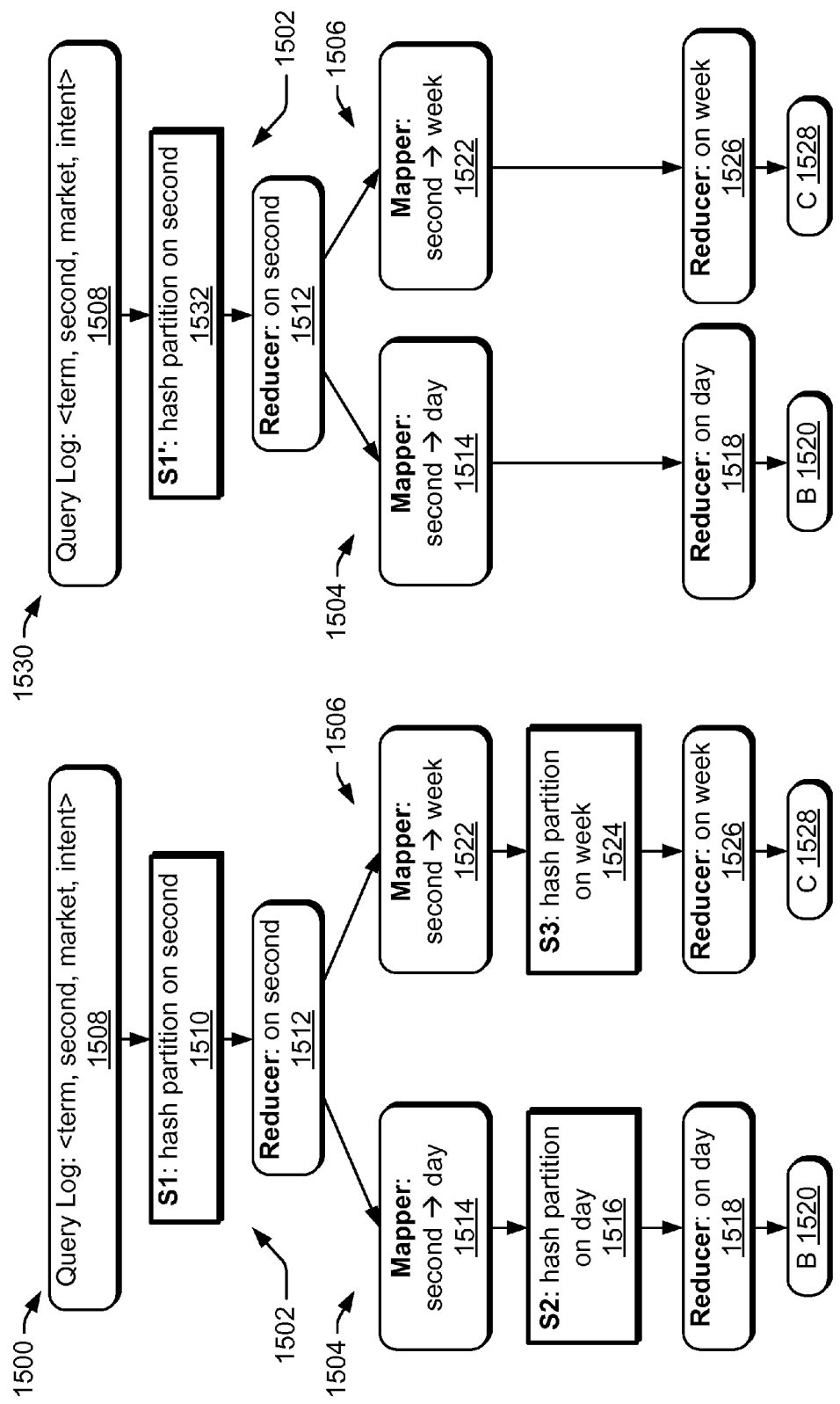

DATA-PARALLEL COMPUTATION MANAGEMENT

BACKGROUND

Data-parallel computation processes (or jobs) typically involve multiple parallel-computation phases that are defined by user defined functions (UDFs). One factor in data-parallel computation is the creation of data-partitions with appropriate properties to facilitate independent parallel computation on separate machines or partitions in each phase. For example, often before a reducer UDF may be applied in a reduce phase, data-partitions are clustered with respect to a reduce key so that all data entries with the same reduce key are mapped to and are contiguous in the same partition.

To achieve desirable data-partition properties, data-shuffling stages are often introduced to prepare data for parallel processing in future phases. A data-shuffling stage may re-organize and re-distribute data into appropriate data-partitions. For example, before applying a reducer UDF, a data-shuffling stage might perform a local sort on each partition, re-partition the data on each source machine for re-distribution to destination machines, and do a multi-way merge on redistributed sorted data streams from source machines, all based on the reduce key. However, data-shuffling tends to incur expensive network and disk input and output operations (I/O) because it involves all of the data.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

This disclosure describes techniques to relate data-partition properties to data-shuffling in a process function (e.g., user defined function (UDF)) centric data-parallel computation model. Additionally or alternatively, this disclosure discusses defining how a set of functional properties for UDFs change the data-partition properties when the UDFs are applied. Additionally or alternatively, this disclosure discusses a program analysis framework to identify functional properties for UDFs, as well as an optimization framework to reason about and leverage data-partition properties, functional properties, and data-shuffling.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items.

FIG. 1 shows an example table that includes illustrative data-partition properties.

FIG. 6 shows illustrative examples of facts and deduction rules.

FIG. 7 shows an exemplary algorithm for backward Weakest Pre/Post-condition analysis.

FIG. 9 shows an illustrative example of an approach to find valid execution plans.

FIGS. 10a-b show examples of an original process and an optimized process.

FIGS. 15a-b show an illustrative example of an original plan and an optimized plan of an illustrative pipeline of trend-analysis processes.

DETAILED DESCRIPTION

Overview

Figure 2:
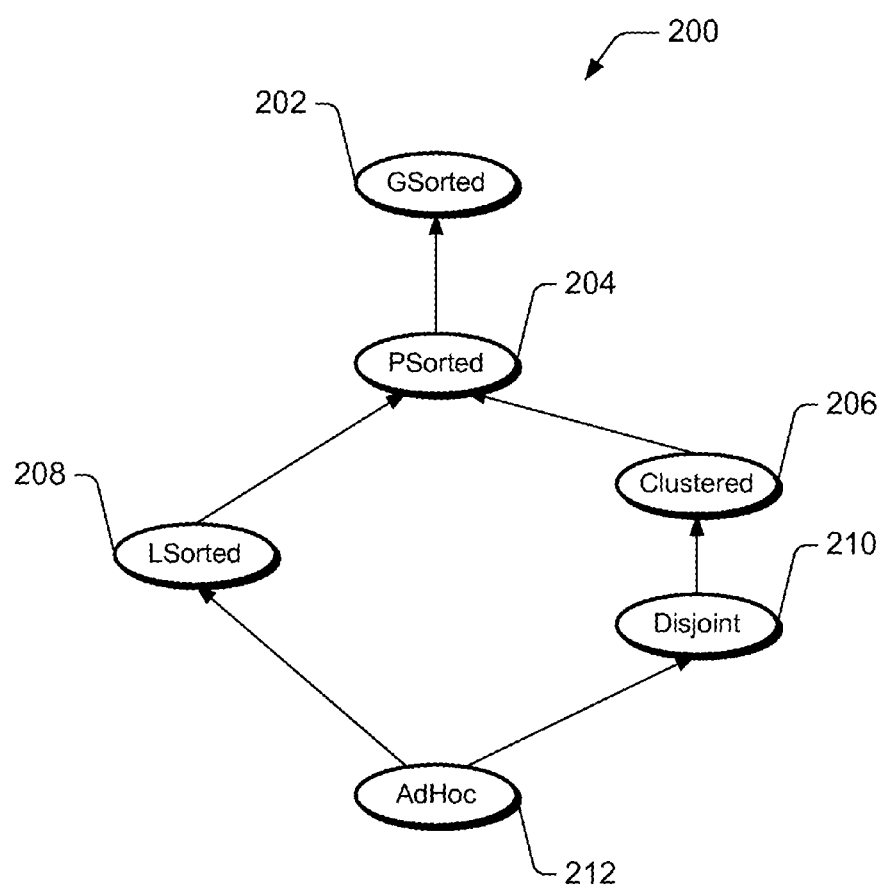
FIG. 2 shows an illustrative data-partition property lattice of data partition properties.

This disclosure describes techniques to relate data-partition properties to data-shuffling in a user defined function (UDF) centric data-parallel computation model. Additionally or alternatively, this disclosure discusses defining how a set of functional properties for UDFs change the data-partition properties when the UDFs are applied. Additionally or alternatively, this disclosure discusses a program analysis framework to identify functional properties for UDFs, as well as an optimization framework to reason about and leverage data-partition properties, functional properties, and data-shuffling.

Often, a data-parallel process treats process functions (e.g., UDFs) as black boxes, meaning, for purposes of this disclosure, that it may be assumed that functionality of the black box is unknown and/or a data-structure of output data may or may not depend on a structure of the input data. For example, it may be assumed that after each application of a UDF, the output data does not retain data configuration or organizational properties that the data may have had before the UDF was applied. This may lead to unnecessary data-shuffling steps that consume unnecessary input/output operations and/or processor cycles since, in some instances, the data may retain some or all configuration or organizational properties after application of the UDF.

This disclosure discusses determining functional properties of UDFs and the affect on data-properties caused by application of the UDF. Understanding what data-properties may be retained after application of a given UDF may allow elimination of unnecessary and expensive data-shuffling stages and improve efficiency of the resulting execution plan. Additionally, this disclosure discusses changing a partition key to create cause data properties to exist at subsequent UDFs. This may allow the elimination of a data-shuffling stage altogether, the replacement of an expensive data-shuffling stage with a relatively lower cost stage, or both.

Illustrative System Model

Often, a typical data-parallel process (or job) performs one or more transformations on large datasets, which usually include a list of records; each with a list of columns A transformation uses a key that comprises one or more columns. For parallel computation, a dataset is often divided into data-partitions that may be operated on independently in parallel by separate processors or machines. A data-parallel process may involve multiple parallel-computation phases whose computations are defined by user defined functions (UDFs). As an illustrative non-limiting example, one of the possible embodiments follows a Map/Reduce/Merge scheme that contains three types of UDFs: mappers, reducers, and mergers. By selecting a low-level "assembly language"-like computation model, illustrative techniques and embodiments may be applied broadly. For example, programs written in various high-level data-parallel languages, including, but not limited to Structured Computations Optimized for Parallel Execution (SCOPE) developed by Microsoft®, Hadoop InteractiVE (HIVE) developed by Apache, PigLatin developed by Yahoo!, and DryadLINQ developed by Microsoft®, may be compiled into processes in the illustrative model.

FIG. 1 shows an example table 100 that illustrates various data-partition properties. For example, data-partition properties (e.g., data conditions) may comprise an organizational relationship of data within a partition and across two or more partitions. Certain data-partition properties, which are often defined with respect to keys, may be expected before a computation phase may be applied. For example, a reducer or a merger may expect all the records with the same key are contiguous in the same partition. In general, data-partition properties specify behaviors within a partition and across partitions, as shown in FIG. 1. Within a partition, records may be contiguous if same-key records are stored together, or may be sorted if the records are arranged by their keys. Across partitions, records may be partitioned if same-key records are mapped to the same partition, or ranged if the records are stored on partitions according to non-overlapping key ranges. Among the nine illustrative combinations shown in FIG. 1, for simplicity and clarity, this disclosure specifically discusses the following six data-partition properties: AdHoc, LSorted, Disjoint, Clustered, PSorted, and GSorted. However, any data-partition properties or combinations of data-partition properties may be utilized. For example, GSorted may mean that the records are sorted within a partition and ranged across partitions. PSorted may mean that the records are sorted within a partition and partitioned across partitions. LSorted may mean that the records are sorted within a partition, but without a particular organization across partitions. Clustered may mean that the records are contiguous within a partition and partitioned across partitions. Disjoint may mean that the records are partitioned across partitions, but without a particular organization within a partition. AdHoc may mean that the records are without a particular organization across partitions, and without a particular organization within a partition. Although contemplated herein, the remaining of the nine combinations are omitted from this discussion.

FIG. 2 shows an illustrative data-partition property lattice 200. In an illustrative embodiment, a data-partition property may be stronger than another that it implies, meaning that a stronger data-partition property may have at least the organizational data-partition properties of a weaker data-partition. For example, GSorted 202 implies PSorted 204, since for example, GSorted 202 is ranged across partitions, which means that it also satisfies a partitioned definition across partitions that may be a characteristic of PSorted 204. Similarly, PSorted 204 implies Clustered 206, since for example, PSorted 204 is sorted within a partition, which means that it also satisfies a contiguous definition within a partition that may be a characteristic of Clustered 206. Such relationships may be captured in the lattice 200 shown in FIG. 2, where a data-partition property is stronger than its lower data-partition properties. With this lattice 200, a maximum (max) set of data-partition properties may be defined as the strongest property that implies all properties in the set. For example, max of Clustered 206 and LSorted 208 is PSorted 204. The minimum (min) is defined analogously to max. For example, the min of LSorted 208 and Disjoint 210 may be AdHoc 212.

Data-shuffling stages may be introduced to achieve appropriate data-partition properties by re-arranging data records without modifying them. A typical data-shuffling stage may comprise three steps: 1) a local-sort step that sorts records in a partition with respect to a key, 2) a re-partition step that re-distributes records to partitions via hash or range partitioning, and 3) a multi-way merge step that clusters re-distributed records based on the key. Any one step or combinations of those steps may be used to achieve certain properties. Achievement of some of the certain properties may use all three steps, while others may use fewer, depending on the data-partition properties before and after data-shuffling.

Figure 3:
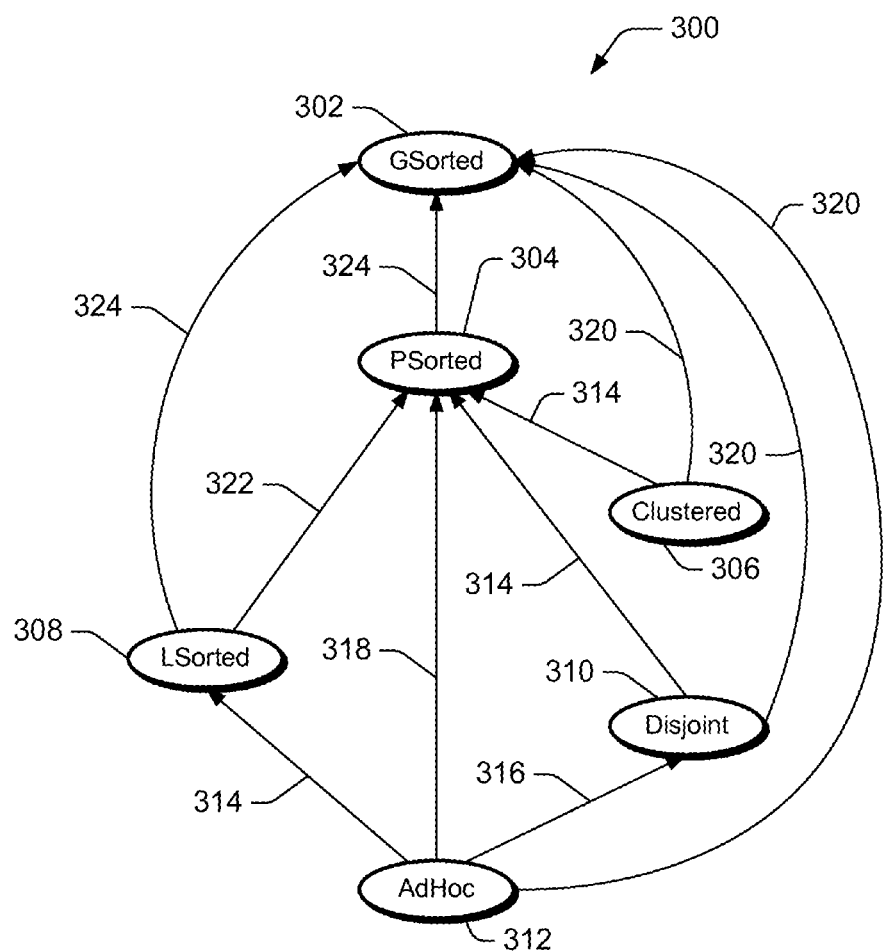
FIG. 3 shows an illustrative relationship between data-partition properties and data-shuffling steps of the data-partition properties.

FIG. 3 shows an illustrative lattice 300 showing relationships between data-partition properties and data-shuffling steps. For example, similar to FIG. 2, lattice 300 comprises GSorted 302, PSorted 304, Clustered 306, LSorted 308, Disjoint 310, and AdHoc 312 data-partition properties. In various embodiments, the data-shuffling step of Local Sort 314 may be applied to data with AdHoc 312 properties to cause the data to have LSorted 308 properties. Additionally, if the data-shuffling step of Repartition(hash) 316 is applied to data with AdHoc 312 properties, data with Disjoint 310 properties may result. Further, if any of the data-shuffling steps of Local Sort, Repartition(hash), and Merge (collectively 318) are applied to data with AdHoc 312 properties, data with PSorted 304 properties may result. Whereas, if any of the data-shuffling steps of Local Sort, Repartition(range), and Merge (collectively 320) are applied to data with AdHoc 312 properties, data with GSorted 302 properties may result. Similarly, if any of the data-shuffling steps of Local Sort, Repartition(range), and Merge (collectively 320) are applied to data with Disjoint 310 properties, data with GSorted 302 properties may result. Similarly, if any of the data-shuffling steps of Local Sort, Repartition(range), and Merge (collectively 320) are applied to data with Clustered 306 properties, data with GSorted 302 properties may result.

Additionally, if the data-shuffling step of Local Sort 314 is applied to data with Disjoint 310 properties, data with PSorted 304 properties may result. Similarly, if the data-shuffling step of Local Sort 314 is applied to data with Clustered 306 properties, data with PSorted 304 properties may result. However, if any of the data-shuffling steps of Repartition(hash) and Merge (collectively 322) are applied to data with LSorted 308 properties, data with PSorted 304 properties may result. Further, if any of the data-shuffling steps of Repartition(range) and Merge (collectively 324) are applied to data with LSorted 308 properties, data with GSorted 302 properties may result. Similarly, if any of the data-shuffling steps of Repartition(range) and Merge (collectively 324) are applied to data with PSorted 304 properties, data with GSorted 302 properties may result. As discussed elsewhere in this disclosure, knowing the resulting data-partition properties after a first data-shuffling step has been applied may allow for the elimination of a, or selection of a less expensive/resource intensive, second data-shuffling step since the resulting data-partition properties after the first data-shuffling step may have some or all of the data-partition properties sought by application of the second data-shuffling step.

Additionally or alternative, in one embodiment, Clustered 306 might not be able to be generated precisely through data-shuffling steps if the implementation for the merge step uses merge-sort. Therefore, in at least that embodiment, PSorted 304 is generated instead to satisfy Clustered 306. As a non-limiting example and for clarity and brevity in the rest of this disclosure, a data-parallel process may be represented as a directed acyclic graph (DAG) with three types of vertices: 1) data vertices that correspond to input/output data, each with an associated data-partition property; 2) compute vertices that correspond to computation phases, each with a type (mapper, reducer, or merger) and a UDF; and 3) shuffle vertices that correspond to data-shuffling stages, each indicating the steps in that stage. The repartitioning stages in shuffle vertices also specify whether hash or range partitioning is used. This DAG may be created manually or generated automatically by a compiler from a program in a high-level language, and allows flexibly to define an optimization scope. For example, the same framework may be used to analyze a pipeline of processes or a segment of a process.

One embodiment contemplates increasing the efficiency and execution speed (collectively "optimize" or "optimization") of data-shuffling by finding a valid execution plan with the lowest cost for a process "J". The execution plan may satisfy the following conditions: 1) the execution plan differs from process J at data-shuffling stages; 2) for each computation phase, the input may have the expected data-partition properties, e.g., data-partitions are Clustered for a reducer and PSorted for a merger; 3) for a merger, the input vertices may have the same data-partitioning (e.g., PSorted or GSorted may be on the same merge key); and 4) the execution plan may preserve all data-partition properties of an output vertex.

Illustrative Example of an Optimization Scheme

Data-shuffling stages in data-parallel models tend to be expensive as they often involve heavy disk and network I/O. The data-shuffling stages are often added to satisfy data-partition properties for subsequent computation phases and to satisfy user expectations on output data. Although a preceding data-shuffling stage may result in certain data-partition properties, a computation phase with a UDF often is not guaranteed to preserve those properties because traditionally, UDFs are considered proverbial "black boxes."

One illustrative embodiment contemplates turning UDFs into proverbial "grey boxes" by defining appropriate functional properties that expose how data-partition properties propagate across phases. For purposes of this disclosure, a "grey box" may mean that some functionality and some data-structure of the output data based at least in part on the input data may be known or determined. This may be in contrast to a proverbial "black box" where it may be assumed that functionality of the black box is unknown and/or data-structure of the output data may or may not depend on the structure of the input data. This may facilitate the identification and elimination of unnecessary data-shuffling steps.

Figure 4:
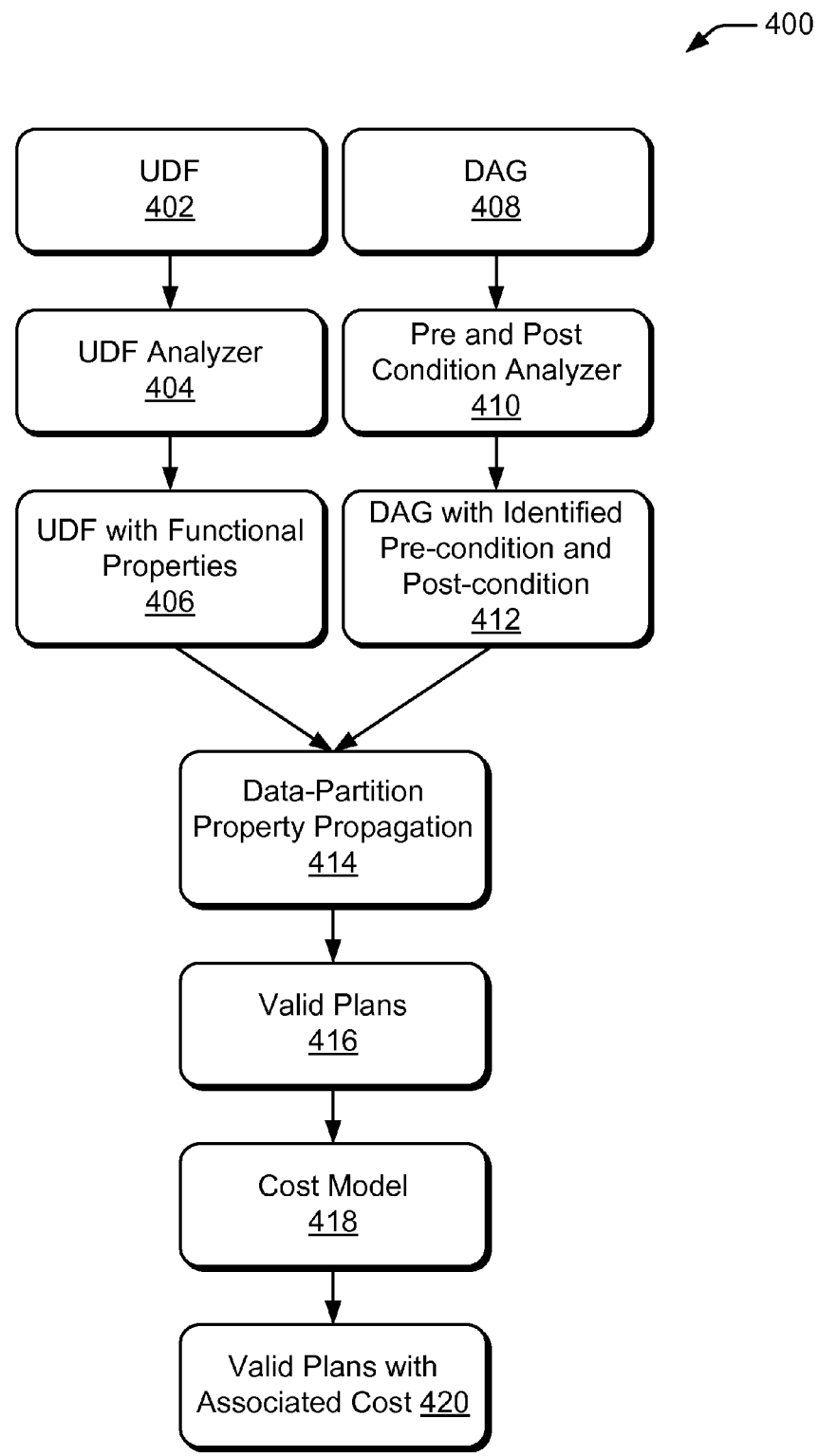
FIG. 4 shows an illustrative flow diagram of an illustrative optimization with functional properties.

FIG. 4 shows an illustrative flow of an illustrative optimization process 400. For example, given a process, UDFs 402 may be extracted and analyzed by a UDF Analyzer 404 to determine UDF functional properties 406. Additionally, a DAG 408 of the process to be run may be analyzed 410 for pre-conditions and post-conditions. For example, a backward Weakest Pre/Post-condition analysis (WP analysis) may compute the weakest pre-condition before each computation phase and the weakest post-condition after each data-shuffling stage. The weakest pre/post-condition computed may be the data-partition property that maintains correctness of data-partition properties expected for each adjacent data-shuffling stage. It is understood that, in some embodiments either the pre-condition or post-condition or both conditions may be used. Forward data-partition property propagation 414 may generate valid execution plans 416 with optimized data-shuffling stages. The valid plans 416 may be analyzed in light of a cost model 418 to determine the resources, time, or both, that each valid plan consumes. The cost model 418 may associate a cost with valid plans 420. Various embodiments contemplate that a plan with the lowest cost according to a cost model may be selected as the optimized plan.

A functional property may describe an effect on an organizational relationship within input data and an associated organizational relationship within output data. For example, a functional property may describe how an output column that is computed by a UDF is dependent upon the input columns of the UDF. Functional properties that preserve or transform data-partition properties may be identified. In various embodiments, those functional properties may be identified through automatic program analysis. For clarity and brevity, this discussion focuses on deterministic functions that compute a single output column from a single input column in one single record; however, it is understood that this disclosure is not limited to this illustrative example. In various embodiments, a UDF might exhibit one functional property on one output column and another functional property on another column. As a non-limiting example, this discussion is directed to columns that are used as a reduce key, merge key, or re-partition key, as well as those used to compute those keys.

Various embodiments may utilize functional properties exhibited by UDFs. For example, a pass-through function $f$ may be an identity function where the output column is the same as the corresponding input column. Often, a reducer/merger is a pass-through function for the reduce/merge key. A pass-through function likely preserves all data-partition properties.

Additionally or alternatively, function $f$ may be strictly-monotonic if and only if, for any inputs x1 and x2, $x1<x2$ always implies $f(x1)<f(x2)$ (strictly-increasing) or always implies $f(x1)>f(x2)$ (strictly-decreasing). Examples of strictly-monotonic functions include, but are not limited to, normalizing a score (e.g., score'=lg(score)/$\alpha$), converting time formats (e.g., DateTime.ToFileTime( )), adding common prefix or suffix to a string (e.g., supplementing "http://" and "/index.html" to the head and tail of a site), and linear transformations (e.g., y=a·x+b where a≠0). A strictly-monotonic function may also preserve all data-partition properties, although the output column may be in a reverse sort-order.

Additionally or alternatively, function $f$ may be monotonic if and only if, for any inputs x1 and x2, $x1<x2$ implies $f(x1) \leq f(x2)$ (increasing) or $f(x1) \geq f(x2)$ (decreasing). Examples of monotonic functions include, but are not limited to, time-unit conversion (e.g., minute=[second/60]) and substring from the beginning (e.g., "abcd"→"ab" and "ac123"→"ac"). Monotonic functions may preserve sort-order within a partition, but might not be guaranteed to preserve partitioned or ranged properties across partitions because two different input keys may be mapped to the same output key.

Additionally or alternatively, function $f$ may be one-to-one if and only if, for any inputs x1 and x2, $x1 \neq x2$ implies $f(x1) \neq f(x2)$. Examples of one-to-one UDFs include, but are not limited to, reversing uniform resource locators (URLs) (e.g., "www.acm.org"→"org.acm.www") and encryption algorithms (e.g., MD5 Message-Digest Algorithm calculation (assuming no conflicts)). One-to-one functions may not preserve sort-order, but may preserve contiguity within a partition and the partitioned property across partitions. As a result, it may preserve data-partition properties such as Disjoint and Clustered, but may downgrade GSorted and PSorted to Clustered.

Figure 5:
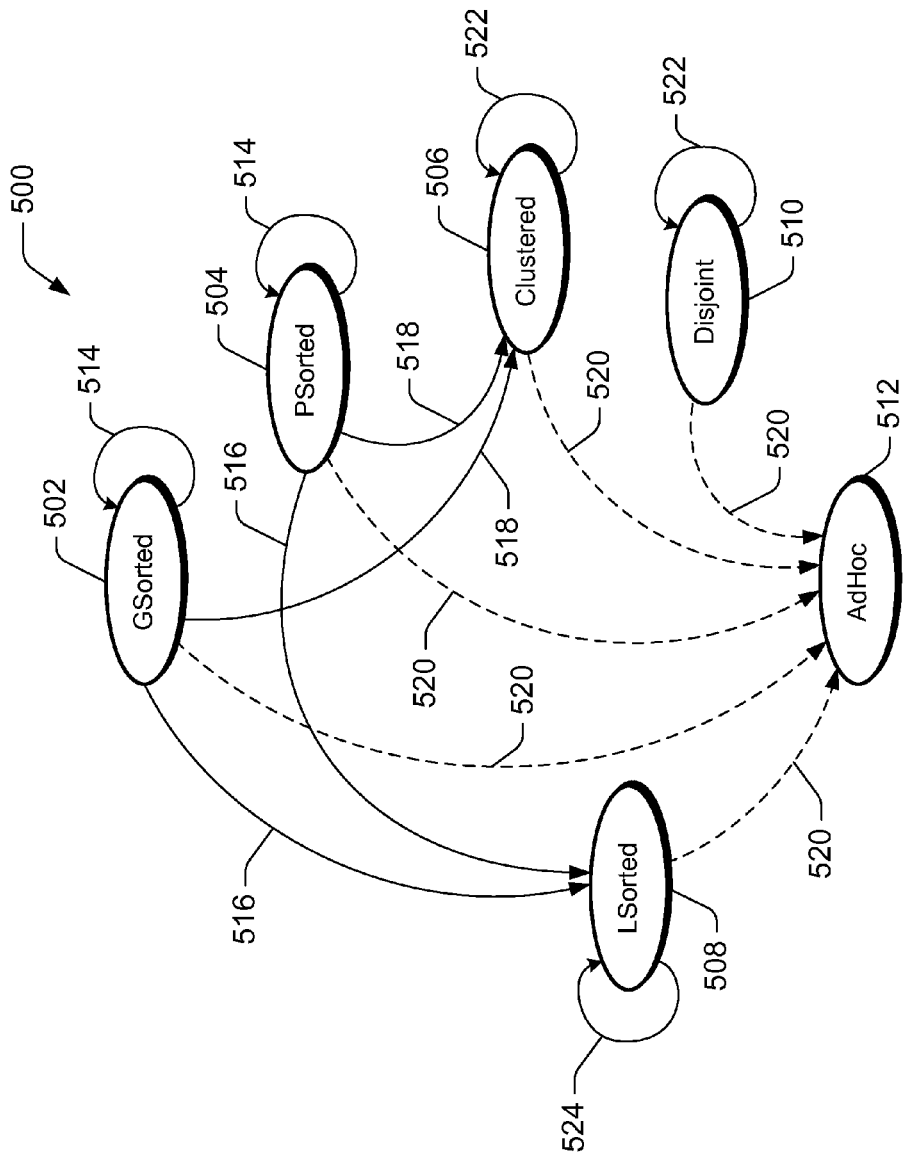
FIG. 5 shows an example system of data-partition properties propagating through UDFs with various functional properties.

FIG. 5 shows an illustrative lattice 500 showing an example of how data-partition properties may propagate through UDFs with various functional properties. As discussed elsewhere in this disclosure, knowing the effects on data properties of a UDF with certain functional properties may allow for the elimination of, or replacement with a less expensive/resource intensive, data-shuffling step. For example, a first UDF applied to data with a first set of data-partition properties may result in a second set of data-partition properties. The second set of data-partition properties may be adequate for application of a second UDF and a data-shuffling step between the first and second UDFs may be eliminated. Similar to FIG. 2, lattice 500 comprises GSorted 502, PSorted 504, Clustered 506, LSorted 508, Disjoint 510, and AdHoc 512. In various embodiments, a UDF with Pass-Through or Strictly-Monotonic properties (collectively 514) applied to data with GSorted 502 data properties, may be sufficient and necessary to preserve GSorted 502 data properties. Further, a UDF with Monotonic properties 516 applied to data with GSorted 502 data properties may cause LSorted 508 data properties in the data. Similarly, a UDF with One-to-One properties 518 applied to data with GSorted 502 data properties may cause Clustered 506 data properties in the data. However, a UDF with other functional properties 520 applied to data with GSorted 502 data properties may cause AdHoc 512 data properties in the data.

In various embodiments, a UDF with Pass-Through or Strictly-Monotonic properties (collectively 514) applied to data with PSorted 504 data properties, may be sufficient to preserve PSorted 504 data properties. Further, a UDF with Monotonic properties 516 applied to data with PSorted 504 data properties may cause LSorted 508 data properties in the data. Similarly, a UDF with One-to-One properties 518 applied to data with PSorted 504 data properties may cause Clustered 506 data properties in the data. However, a UDF with other functional properties 520 applied to data with PSorted 504 data properties may cause AdHoc 512 data properties in the data.

In various embodiments, a UDF with Pass-Through, Strictly-Monotonic, or One-to-One properties (collectively 522) applied to data with Clustered 506 data properties, may be sufficient to preserve Clustered 506 data properties. However, a UDF with other functional properties 520 or Monotonic properties applied to data with Clustered 506 data properties may cause AdHoc 512 data properties in the data.

In various embodiments, a UDF with Pass-Through, Strictly-Monotonic, or One-to-One properties (collectively 522) applied to data with Disjoint 510 data properties, may be sufficient to preserve Disjoint 510 data properties. However, a UDF with other functional properties 520 or Monotonic properties applied to data with Disjoint 510 data properties may cause AdHoc 512 data properties in the data.

In various embodiments, a UDF with Pass-Through, Strictly-Monotonic, or Monotonic properties (collectively 524) applied to data with LSorted 508 data properties, may be sufficient to preserve LSorted 508 data properties. However, a UDF with other functional properties 520 or One-to-One properties applied to data with LSorted 508 data properties may cause AdHoc 512 data properties in the data.

Additionally or alternatively, a monotonic UDF functionality may be sufficient for preserving LSorted 508; one-to-one UDF functionality may be sufficient for preserving Clustered 506; and strictly-monotonic UDF functionality may be sufficient for preserving GSorted 502.

In various embodiments, UDFs may be annotated with appropriate functional properties. Additionally or alternatively, program-analysis techniques may infer properties automatically when possible, in a bottom-up approach. Often, functional properties focus on the dependency relationship between an output column and its relevant input columns allowing program slicing to extract a UDF's core function to infer its functional property with respect to each output column of interest. For example, the input columns may comprise facts to which deduction rules may be applied to the low-level instructions as well as third-party library calls to infer functional properties recursively until a fixed point is reached. The process may return the final functional properties associated with the UDFs upon termination.

FIG. 6 shows examples of facts and deduction rules for various types of UDFs. For example, FIG. 6 shows illustrative facts and deduction rules 600 in a datalog format, where StInc, StDec, Inc, and Dec stand for strictly-increasing, strictly-decreasing, increasing, and decreasing, respectively. For purposes of this disclosure, a fact may represent the property of a function between a variable in a UDF and an input column that the variable is computed from. For example, for a variable y and an input column t, such that $y=f(t)$ for some function $f$, One2One(y, t) states that $f$ is a one-to-one function. For example, FIG. 6 (line 1) defines the illustrative fact that every input column may be considered a PassThrough function over itself.

For purposes of this disclosure, deduction rules may infer the functional property of an instruction's output operand from the functional properties of its input operands. Deduction rules may include, but are not limited to, the examples shown in FIG. 6 (lines 3-5). For example, a first exemplary deduction rule (line 3) may state that, for ASSIGN instructions, the functional property of the input operand x may be propagated to the output operand y (the "_" symbol may represent any functional property). The second and third exemplary deduction rules may state that, for ADD instructions, the output operand is strictly-increasing as long as one of the input operands is strictly-increasing, while the other is increasing.

In various embodiments, UDFs may also call into functions in third-party libraries. Various embodiments contemplate applying deduction rules directly to the instructions in the library calls, or treating these function calls simply as "instructions" and providing deduction rules manually. Various embodiments contemplate accumulating a knowledge base with manually provided deduction rules for commonly used library calls. Those manual annotations may be useful for cases where the automatic inference runs into its limitation. For example, the functional property for MD5 shown in FIG. 6 (line 7) may not be inferred automatically. Additionally, or alternatively, various embodiments contemplate automatically assigning annotations using the accumulated knowledge base.

Various embodiments contemplate rules that encode the relations among functional properties, where one functional property might imply another. Examples of such rules include, but are not limited to, those shown in FIG. 6 (lines 9-13). Various embodiments contemplate defining Func as the weakest functional property that satisfies no specific constraints and also introduce Constant as a pseudo functional property for constant values, which may be both increasing (Inc) and decreasing (Dec).

Various embodiments contemplate, determining the expectation on each data-shuffling stage for validity as part of a valid execution plan. An embodiment may apply a backward WP analysis to compute the weakest pre-condition before each computation phase and the weakest post-condition after each data-shuffling stage that maintains correctness of expected data-partition properties.

FIG. 7 shows an exemplary algorithm 700 for backward WP analysis. For example, when visiting a new vertex, the backward WP analysis may compute the weakest pre-condition and post-condition as shown in FIG. 7. In this example, the weakest post-condition associated with a data-shuffling stage may be the data-partition property expected on the result of that stage.

Figure 8:
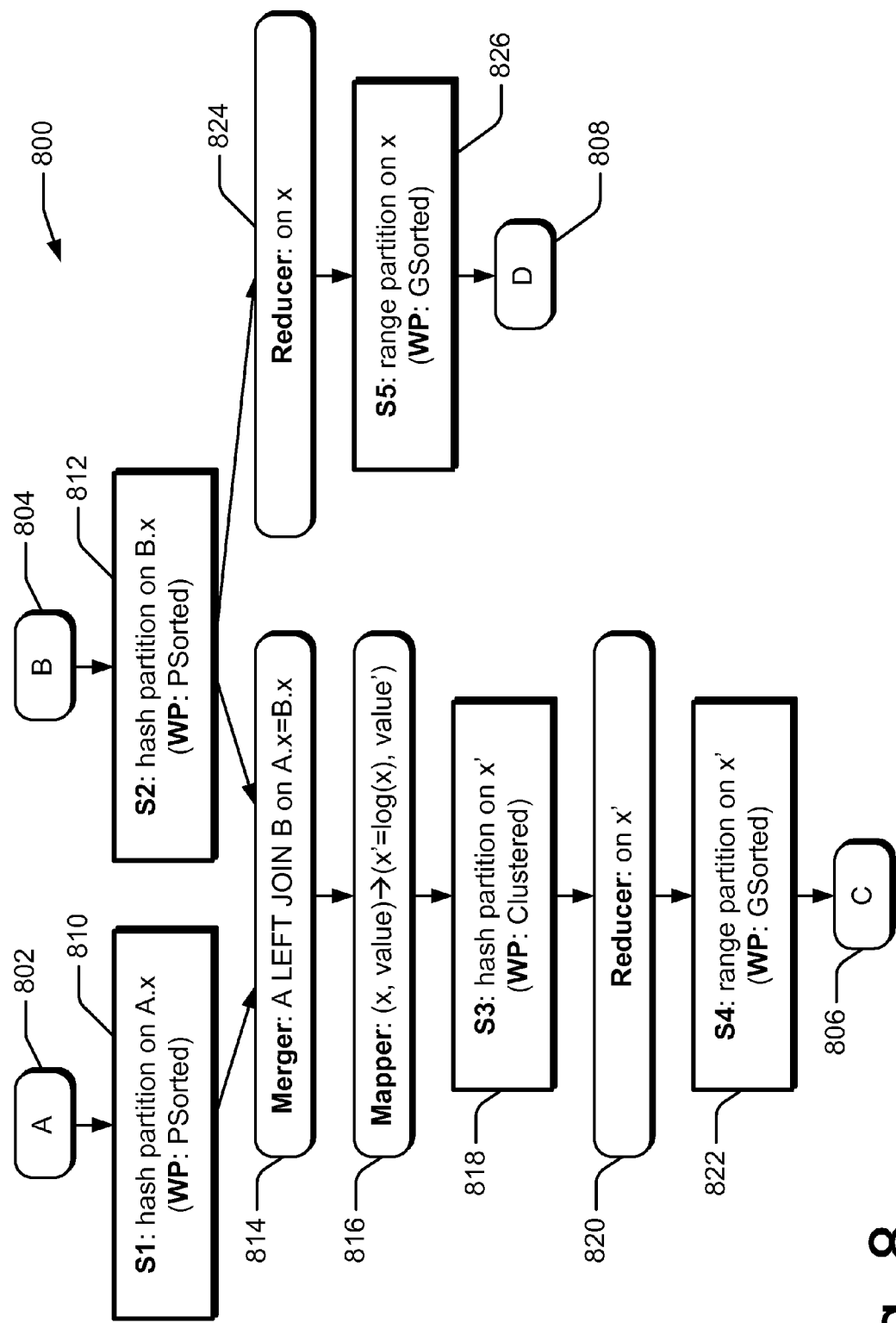
FIG. 8 shows an illustrative sample data-parallel process.

FIG. 8 depicts a sample data-parallel process. For example, FIG. 8 shows a sample compiled directed acyclic graph (DAG) 800 from a SCOPE process where A, B, C, and D correspond to data vertices 802, 804, 806, and 808; rectangles correspond to data-shuffling stages; and rounded rectangles correspond to computation phases with UDFs. In this illustrative example, an embodiment contemplates analyzing the UDFs in the process, and annotating them with functional properties.

For example, data A 802 has the data-shuffling stage S1 810 applied while data B 804 has the data-shuffling stage S2 812 applied. The results of S1 and S2 are merged at 814. The results of the merger at 814 are mapped at 816. The data-shuffling stage S3 818 is then applied to the results of the mapper at 816, the results of which are reduced at 820. The data-shuffling stage S4 822 is applied to the results of the reducer at 820, the results of which comprise data C 806. Additionally, the results of S2 are reduced at 824. The data-shuffling stage S5 826 is then applied to the results of the reducer at 824, the results of which comprise data D 808.

In this illustrative case, both the merger and the reducers are pass-through functions, and the mapper is a strictly-monotonic function (using log). This illustrative embodiment contemplates applying a backward WP analysis to determine the weakest post-condition for the data-shuffling stages. In this example, the backward WP analysis results in GSorted for S4 and S5, Clustered for S3, PSorted for S1, and max (PSorted, Clustered)=PSorted for S2.

Various embodiments contemplate, after the backward WP analysis is complete, finding valid execution plans through forward data-partition property propagation. This process may track output data-partition property in a CurrentPostDP field for each vertex and discover valid query plans along the way.

FIG. 9 shows an exemplary algorithm 900 to identify valid alternate execution plans for a data-parallel process. For example, one possible approach is to set the steps in each data-shuffling stage in order to generate valid execution plans. This may be done, for example, through a recursive procedure ForwardExplorer shown in FIG. 9. In this example, the procedure ForwardExplorer takes the current execution graph (currGraph) and the current suffix of the topologically ordered list of vertices (traverseSuffix) as inputs. The procedure may also use additional functions, including, but not limited to, DPPropertyTransition that may take an input data-partition property and a functional property, and output the resulting data-partition property based on a propagation graph, for example, as shown in FIG. 5; GetShufflingSteps may take an input data-partition property and an output data-partition property, and output the data-shuffling steps, for example, according to FIG. 3; ValidateMerge may check whether input vertices of a merger phase conform to the same data-partition property (for example, PSorted or GSorted on the merge key).

Additionally or alternatively, revisiting the example shown in FIG. 8, various embodiments contemplate creating a different execution plan. For example, applying the illustrative approach shown in FIG. 9, the CurrentPostDP may be set to AdHoc for the input data vertices and PSorted for S1 and S2. In this example, since the Merger may be a pass-through function, its CurrentPostDP may be set to PSorted. The CurrentPostDP may also be set to PSorted after the Mapper because it is strictly-monotonic. Because PSorted may imply Clustered, which is the weakest post-condition for S3, all steps of S3 may be removed to produce an alternative valid plan.

In various embodiments, all valid execution plans may be enumerated. Additionally or alternatively, heuristics may be applied to limit the candidates if there are too many valid execution plans to evaluate. Regardless, the valid executions may be evaluated based on a cost model, where the valid execution plan with the lowest cost may be chosen.

Additional Illustrative Example of an Optimization Scheme

Not all UDFs have the desirable functional properties for preserving data-partition properties, especially when it is conservatively assumed that the input data may be arbitrary. Various embodiments contemplate leveraging the ability to re-define a partitioning key to apply some constraint to the input data so as to preserve certain data-partition properties (e.g., Disjoint) for optimizing data-shuffling. These mechanisms may further increase the coverage of an optimization framework described above. Various embodiments described herein contemplate re-defining partitioning keys to allow preservation, modification, and/or manipulation of data-partition properties.

FIGS. 10a-b show an example of an original process 1000 and an optimized process 1002 according to one embodiment. For example, consider the case 1000 shown in FIG. 10a where the data-shuffling stage S1 1006 is performed on data A 1004, and where the output is reduced at 1008 and then mapped at 1010. The data-shuffling stage S2 1012 is performed on the mapped data at 1010, where the output is reduced at 1014, resulting in data B 1016. In this example with two data-shuffling stages S1 1006 and S2 1012, where S1 1006 does a hash re-partitioning on key x, S2 1012 does a hash re-partitioning on key x0, and mapper m2 may not be one-to-one, the steps in S2 1012 may not be eliminated using the algorithm discussed above since m2 may not have the desired functional property. It may, however, be possible to re-define the partitioning key in S1 1006 by taking into account m2 and S2 1012, in order to eliminate some steps in S2 1012. For example, if m2 maps each x to a single x0, various embodiments may apply hashing on m2(x) for S1 1006, rather than on x directly. Then, this hash re-partitioning may ensure, not only that the records with the same x are mapped to the same partition, but also that the records with the same x0 after applying m2 are mapped to the same partition. This may help eliminate the re-partitioning step in S2 1012.

For example, consider the case 1002 shown in FIG. 10b where data A 1004 has the data-shuffling stage S1' 1018 performed on it by hashing m2(x) rather than on x directly, as is done at 1006. The output of S1 1018 may be reduced at 1020 and then mapped at 1022. The mapped data at 1022 now may need only a Local Sort to be applied at 1024 for the output to be reduced at 1026, resulting in data B 1028.

Various embodiments contemplate that, although this approach may reduce the amount of total network I/O by eliminating a later re-partitioning step, the re-partitioning in S1' 1018 may be slightly more expensive in time and resources as it may have to invoke m2 on the input records. For example, if the number of input records far exceeds the number records in the later mapper phase with m2 because the reducer on x at 1008 and 1020 may reduce the number of records at the later data-shuffling stage. To reduce this extra overhead, various embodiments contemplate applying program slicing to get a simpler function, similar to the approach discussed with respect to the analysis of functional properties. Additionally or alternatively, the partitioning might lead to data skew that does not exist in the original plan because of the different partitioning key used. However, various embodiments contemplate using a cost model to assess whether or not to apply this candidate optimization.

Various embodiments contemplate generalizing this type of optimization to a chain of data-shuffling stages. For example, S1, S2, . . . , SN may be a chain of data-shuffling with hash re-partitioning, where before each Si (except for S1) there may be a mapper with UDF mi (i=2 . . . N). To allow for a single re-partitioning to cause the keys in later phases to be partitioned appropriately, a partition function in S1 may be constructed as a hash on (mN . . . m3$m2(x)$), where x is the initial input key.

Additional examples of data-shuffling patterns include, but are not limited to, joined shuffling and forked shuffling. Joined shuffling is often used to implement a JOIN to correlate records in data-parallel programs while forked shuffling is often used allow an input to be consumed by more than one thread.

Figure 11:
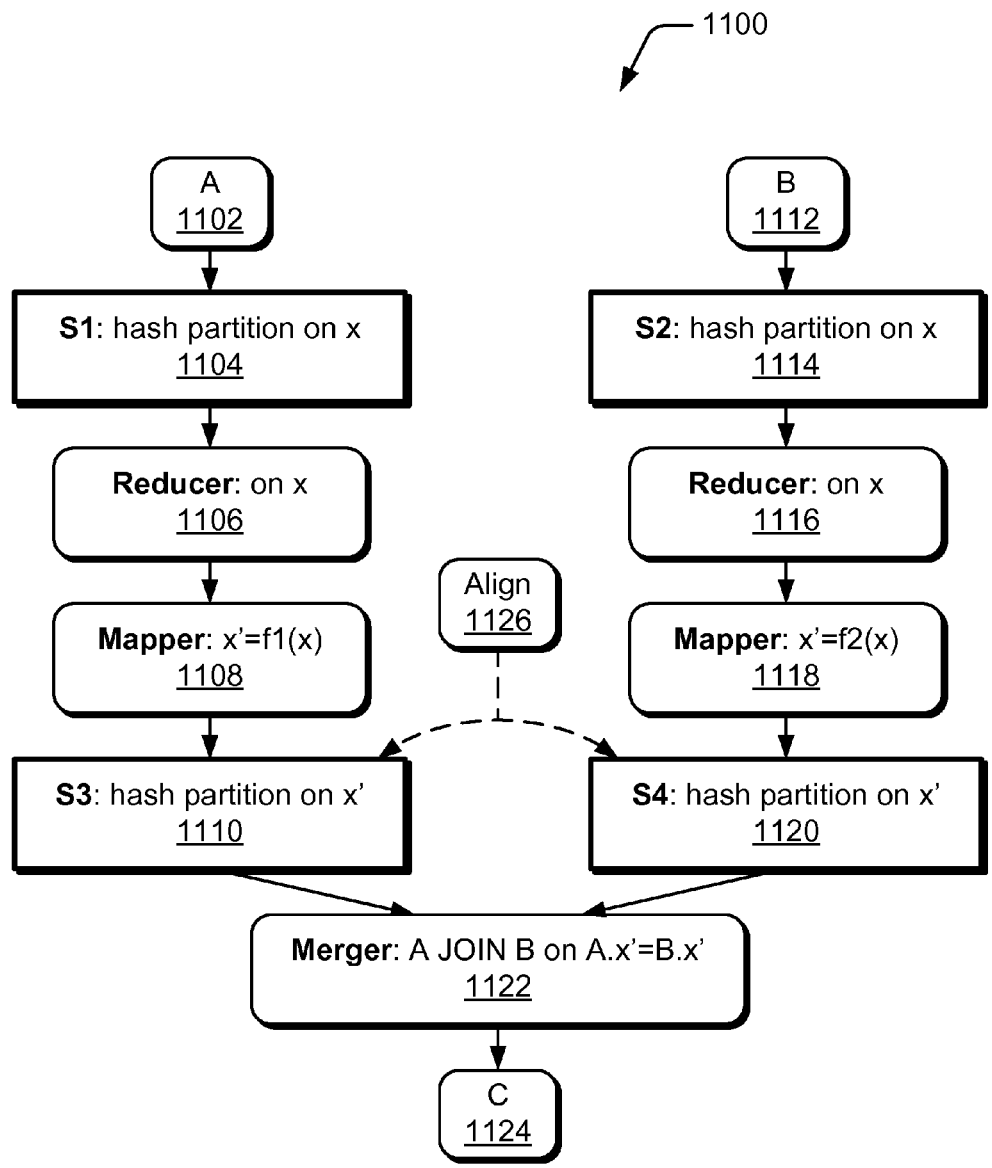
FIG. 11 shows an example of a joined shuffling optimization.

FIG. 11 shows an exemplary case 1100 of a joined shuffling optimization. For example, data-shuffling stage S1 1106 may be performed on data A 1102, where the output is reduced at 1106 and then mapped at 1108. The data-shuffling stage S3 1110 may be performed on the mapped data at 1108. Similarly, the data-shuffling stage S2 1114 may be performed on data B 1112, where the output is reduced at 1116 and then mapped at 1118. The data-shuffling stage S4 1120 may be performed on the mapped data at 1118. The outputs of S3 1110 and S4 1120 may be merged at 1122, resulting in data C 1124.

In this example shown in FIG. 11, data-shuffling stages S3 1110 and S4 1120 are retained and inserted by the merger phase at 1122. This pattern may be considered as the merge of multiple chained data-shuffling, meaning multiple data-shuffling steps are aligned in a chain whose results are merged. For example, one chained data-shuffling may be formed by S1, $f1$, and S3, while another may be formed by S2, $f2$, and S4. Various embodiments contemplate separately using a hash function on $f1(x)$ for S1 and a hash function on $f2(x)$ for S2, allowing for the removal of the re-partitioning in S3 and S4. In this example, due to merger, the two chains may be aligned, for example, at 1126 in that the same key may be mapped to the same partition. This may be achievable when the same hashing is applied to $f1(x)$ and $f2(x)$.

Figure 12:
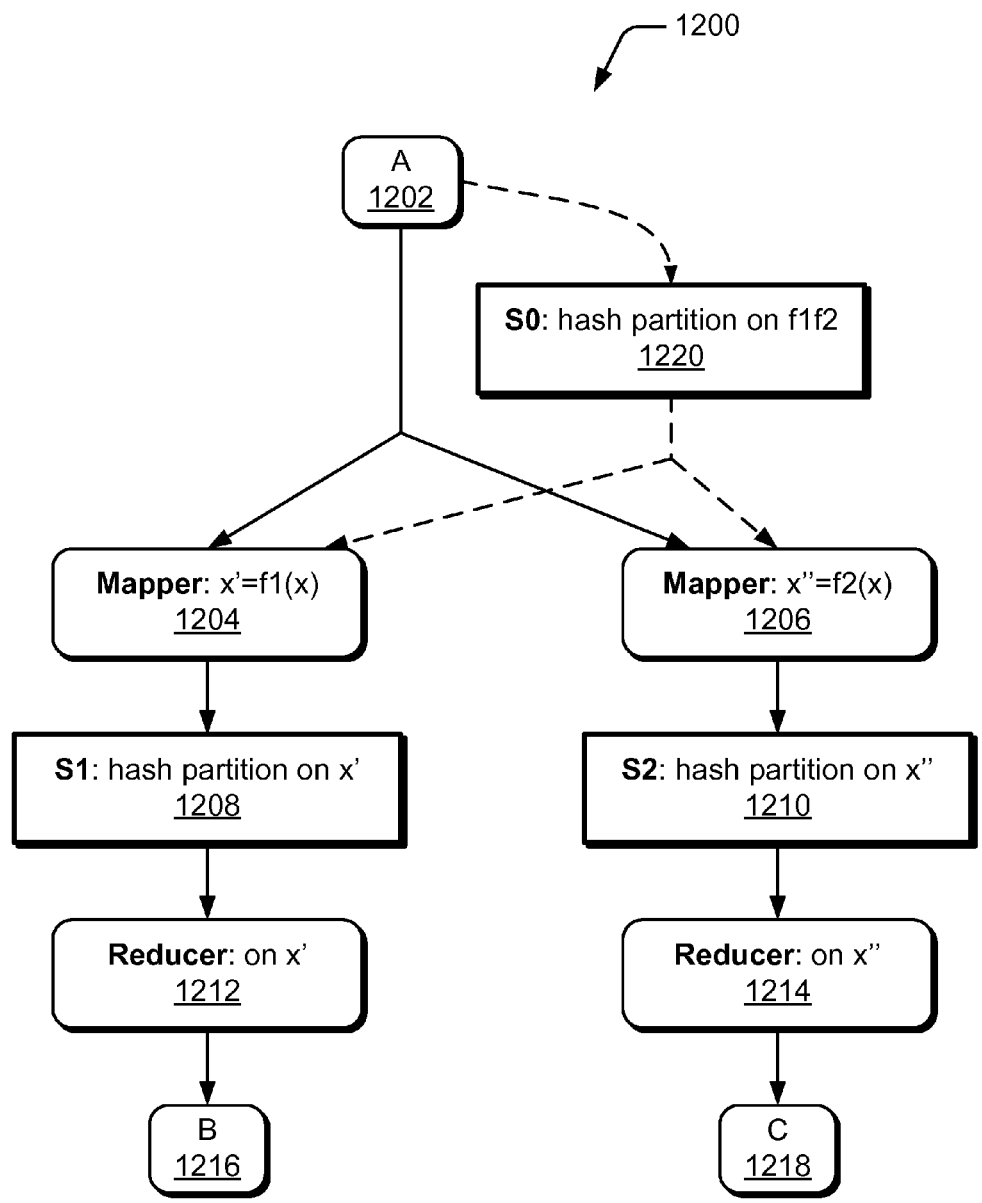
FIG. 12 shows an example of forked shuffling, where an input may be consumed by at least two separate threads of processing.

FIG. 12 shows an example of forked shuffling 1200, where an input A 1202 may be consumed by two separate threads of processing. For example, FIG. 12 shows that $f1$ and $f2$ are two mapper functions at 1204 and 1206 that map a record key from x to x' and x", respectively. Two data-shuffling stages S1 1208 and S2 1210 may perform hash re-partitioning on x' and x", respectively. Two reducer stages at 1212 and 1214 may reduce x' and x", respectively, resulting in data B 1216 and data C 1218, respectively. Various embodiments contemplate that one data-shuffling may be performed, for example, by hashing on a function of x, to create disjoint data-partitions both for $f1(x)$ and for $f2(x)$. That is, the data-shuffling would provide that, if $f1(x1)=f2(x2)$, then x1 and x2 may be mapped to the same partition by S0. This would allow the two data-shuffling stages S1 1208 and S2 1210, to be replaced by one data-shuffling stage S0 1220. For example, given $f1(x)=$ [x/2] and $f2(x)=$[x/3], stage S0 1220 may use [x/6] as the re-partitioning key. Such a function might not always exist, as is the case with $f1(x)=$[x/2] and $f2(x)=$[(x+1)/2]. Various embodiments contemplate constructing the symbolic function automatically. Additionally or alternatively, since constructing the symbolic function automatically may be challenging in some instances, various embodiments contemplate recording known patterns and recognizing them through pattern matching on a sliced data-dependency graph. For example, recognized patterns may include, but are not limited to, the following patterns: $f(x)=$[x/a] and $f(x)=$x mod a, where x may be any integer.

Using the discussed techniques as well as others, various embodiments contemplate creating new execution options with re-defined partitioning keys. Various embodiments contemplate integrating techniques as mechanisms that may preserve certain data-partition properties. These options may be integrated into the framework described above creating additional valid execution plans, which may be evaluated and considered using a cost model.

Illustrative Implementation

Various embodiments contemplate implementing the optimization framework discussed above in existing and forthcoming data-parallel computation systems. For example, one possible embodiment has been implemented and integrated into the SCOPE compiler and optimizer. SCOPE is a SQL-like scripting language for data-parallel computation. The SCOPE optimizer uses a transformation-based optimizer to generate efficient execution plans. The optimizer leverages existing work on relational query optimization and performs rich and non-trivial query rewritings that consider the input script in a holistic manner. One of the embodiments implemented with SCOPE added the capability to reason about functional properties, data-partition properties, and data-shuffling into the current optimizer. Without understanding UDFs, the system may be unable to derive any structural properties and thus potentially miss optimization opportunities. However, the systems and process described herein are able to identify functional properties between input and output columns and then integrate those functional properties into the optimization framework. This enables efficient property derivation and allows the optimizer to optimize query plans with UDFs effectively.

Figure 13:
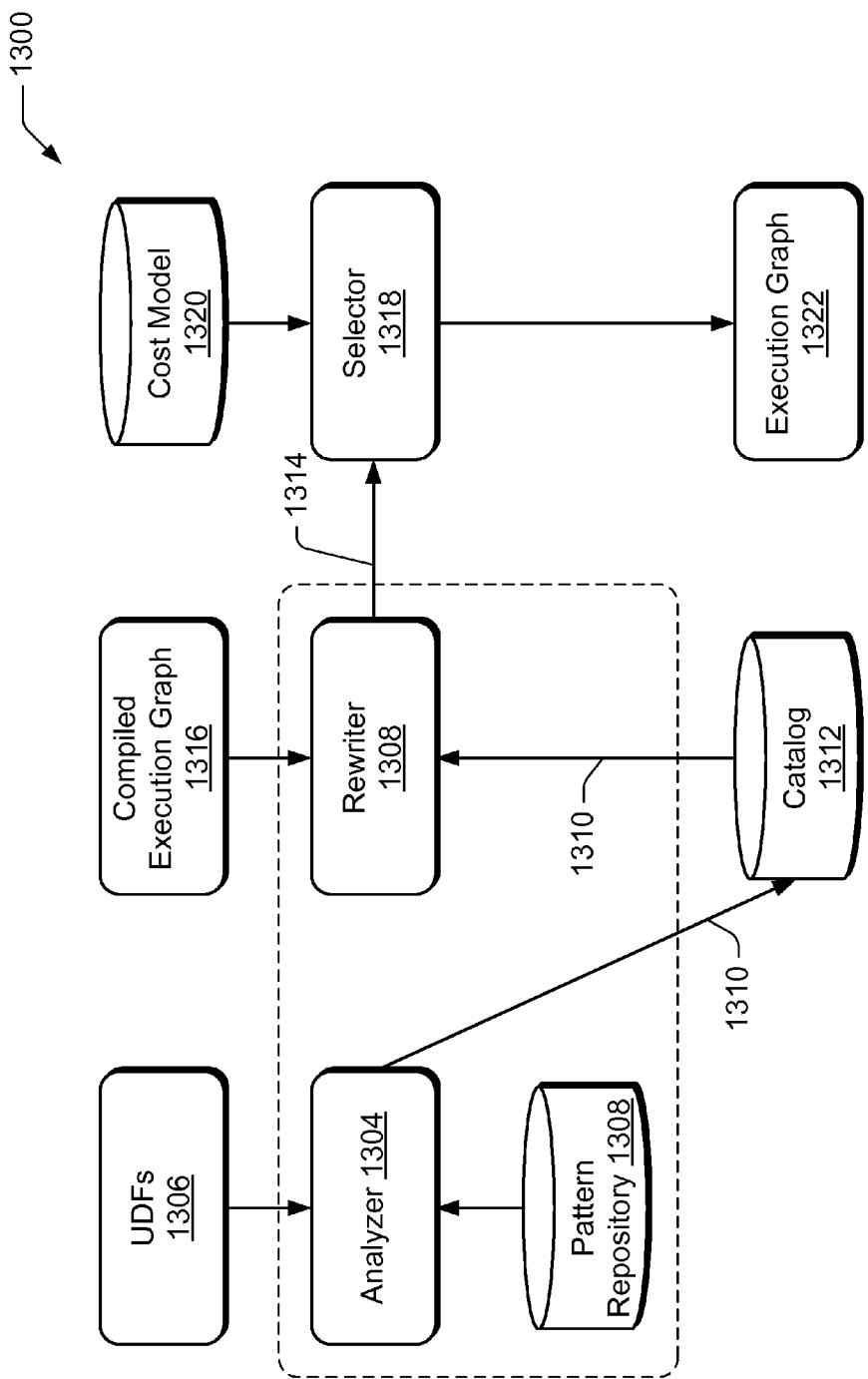
FIG. 13 depicts an illustrative architectural overview of a compiler and optimizer.

FIG. 13 depicts an illustrative architectural overview 1300 of an embodiment, its components, and the interactions with the existing components in a SCOPE compiler and optimizer. For example FIG. 13 shows a UDF Analyzer 1302 and a Rewriter 1304 as two modules, however, it is understood that the functionality may be implemented in one module or distributed across multiple modules and/or machines locally or remotely. The UDF Analyzer 1302 may extract the functional properties of the UDFs 1306 and may leverage patterns from a Pattern Repository 1308. The analyzed UDFs may be associated with functional properties 1310 and stored in a Catalog 1312. The Rewriter 1304 may generate optimized execution plans 1314 by leveraging the functional properties 1310 when examining and rewriting processes from a Compiled Execution Graph 1316. The execution plans 1314 may be fed to a Selector 1318, which may use a cost model 1320 to select an execution plan for a replacement Execution Graph 1322.

One of the possible embodiments implements a UDF analyzer, similar to UDF analyzer 1302, at a high-level IR (HIR) of a framework (e.g., a Phoenix framework shipped with Microsoft® Visual Studio 2010), together with a database engine (e.g., the BDD-Based Deductive DataBase (bddbddb) engine). Phoenix is a framework for building compiler-related tools for program analysis and optimizations. It allows external modules to be plugged in with full access to the internal Phoenix Intermediate Representation (IR). With Phoenix, the analyzer may feed the instructions and the library calls for a given UDF to the bddbddb engine, together with the deduction rules. The engine then applies the deduction process.

In one of the embodiments, the top eight (8) unary operators and seven (7) binary operators (excluding the operator opcode CALL) are selected based at least in part on frequency of use. These operators account for a majority of operator uses (excluding CALL). In this embodiment, various rules for those operators may be selected using several heuristics including, but not limited to, (i) some instruction type, for example ASSIGN and BOX, which belong to the same equivalent class as they share the same set of deduction rules, (ii) binary operators (for example, the ADD operator shown in FIG. 6, lines 4 and 5) that often include more than one rule. Several additional pseudo operators may be added to convert some operators to other operators. For example, NEGATE and RECIPROCAL may be added to convert SUBSTRACT and DIVIDE to ADD and MULTIPLY respectively, thereby reducing the total number of rules.

Additionally or alternatively, constraints are often used in the rules for precision. The constraints may be on some aspects of the operands, for example, the types and value ranges of the operands. For example, the CONVERT operator may be used to convert numbers between different types. Converting a number from a type with a smaller byte size to one with a larger size (e.g., from int to double) may preserve its value. This conversion may be considered a pass-through function. However, this may not be the case for the opposite direction. Various embodiments extract operand types and may make the rules type-sensitive with the type constraints embedded to handle these cases.

Additionally or alternatively, the UDFs may contain loops and branches. For example, the value of an operand may come from any one of its input operands defined in any of the branches. Various embodiments introduce the INTERSECT operator that may have the rule stating that the output operand may have a certain property if both its input operands have the same functional property.

One of the possible embodiments implemented contemplates that the rewriter generates valid execution plans using the algorithms discussed above. For example, one of the possible embodiments contemplates that the rewriter may work at the "physical" level, while the SCOPE optimizer may start with logical relational operators. For ease of implementation in various embodiments, the rewriter may take as input the best physical execution plan from the SCOPE optimizer. The results from this embodiment of the rewriter may then be assessed based on the internal cost model of the SCOPE optimizer. This embodiment of integration might lead to suboptimal results as two optimization phases are carried out separately. Other embodiments contemplate integrating the rewriter into the SCOPE optimizer to reason about functional properties and structured data properties in a single uniform framework. This may further provide seamless generation and optimization of both serial and parallel query plans.

Illustrative Examples of Implementation

Various embodiments may be implemented in web search related SCOPE processes. In this illustrative implementation, the processes may run on the same cluster as a process that was previously collected. The number of machines that may be used in each process may depend on the size of the input data.

One illustrative embodiment may relate to anchor data. For example, hyperlinks in web pages may form a web graph. Anchor texts associated with hyperlinks, together with the web graph, may be valuable for evaluating the quality of web pages and other search-relevance related metrics. One of the anchor-data pre-processing processes may be to put the anchors that point to the same page together (using a data-shuffling stage), and de-duplicate the anchors with the same text. The process may further output the reversed URL and the anchor text pairs, e.g., ("org.acm.www/sigs", anchor text) instead of ("www.acm.org/sigs", anchor text). Since this reversed URL format may be the de-facto representation of a URL, URLs of the same domain may be laid out contiguously in this format to enable simple domain-level aggregations.

Figures 14A, 14B:
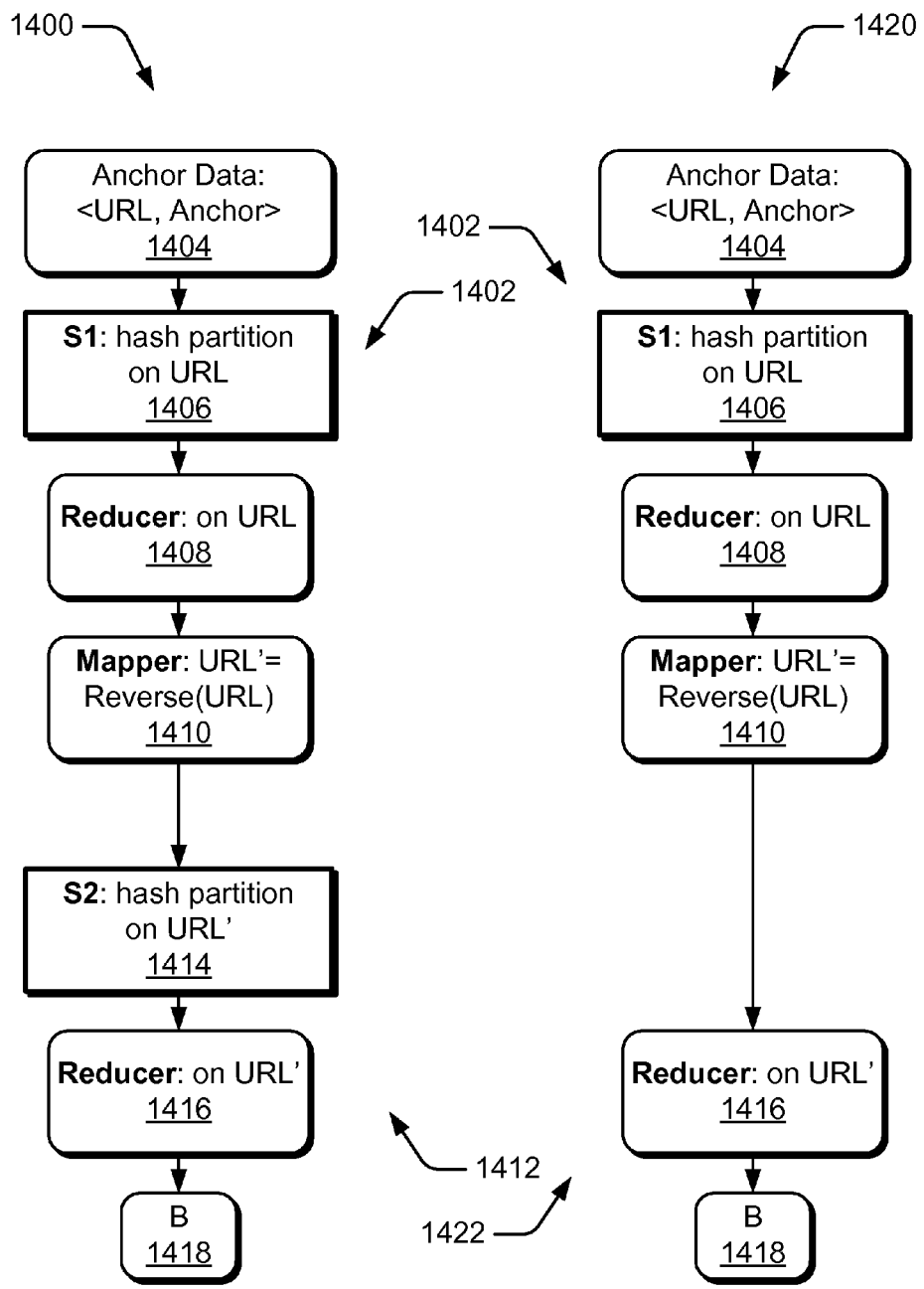
FIGS. 14a-b show an illustrative example of an original plan and an optimized plan.

FIGS. 14a-b show an illustrative example of an original plan and an optimized plan for executing a data-parallel computation process. For example, FIG. 14a shows a plan 1400 where a first process 1402 takes anchor data 1404, performs a data-shuffle S1 1406, reduces on URL at 1408, and maps the data at 1410. The plan 1400 also contemplates a second process 1412 where the data is shuffled S2 at 1414 and reduced at 1416, where the results are shown at 1418. In this example, the second process 1412 attempts to count the words in the anchor text for each URL. Before evaluation and optimization, the second process 1412 may have to insert a data-shuffling stage S2 1414 to group the data by URL.

In an illustrative embodiment of an optimization, and with respect to FIG. 4, the UDF analyzer 404 may analyze the reversing UDF determining it to be a one-to-one function. The pre-condition and post-condition analyzer 410 may determine that the condition of data properties expected for the reduction at 1416 may be the Clustered property. The data-partition property propagation at 414 may determine that the reversing performed at 1410 may preserve the Clustered property. The plan 1420, where stage S2 1414 may be eliminated from the second process 1422, may be formulated as a valid plan at 416. The plan 1420 may be selected as the optimized plan based on the associated cost determined at 418.

An illustrative embodiment may relate to trend analysis. For example, trend analysis may be a way to understand how things change over time, which may be useful for many search related applications as well as being a stand-alone service. One kind of trend-analysis process may collect the {term, time, aspect} tuples in the search-query logs, where term may be the search keyword, time may correspond to a time when the query is submitted, and aspect may represent one of the search query's property (e.g., its market), and may aggregate various aspects' occurrences at different time-scales such as hours, days, and months. For instance, the top three markets over the years for a specific brand may be determined using trend analysis.

FIGS. 15a-b show an illustrative example of an original plan and an optimized plan of an illustrative pipeline of trend-analysis processes. For example, FIG. 15a shows a pipeline 1500 of three processes 1502, 1504, 1506. The first process 1502 may pre-process input query logs and aggregate entries within the same variable (e.g., second) for the aspects desired. For example, the first process 1502 may apply data-shuffling S1 1510 to data 1508 and then reduce the output at 1512. The second process 1504 may calculate the {term, time, market} distribution over days, and the third process 1506 may calculate the {term, time, intent} distribution over weeks, where intent may be obtained from user-click-behavior of the queries and tell whether the search query is for information, business, or other purposes. For example, the second process 1504 may map the data at 1514, shuffle the data at 1516, and reduce at 1518, resulting in data B 1520. Similarly, the third process 1506 may map the data at 1522, shuffle the data at 1524, and reduce at 1526 to result in data C 1528.

Before optimization, each process 1504 and 1506 may include data-shuffling stages S2 1516 and S3 1524. However, after analysis, the illustrative embodiment may identify a valid plan 1530 where the three shuffling stages are merged into one S1' 1532 and the partition key in the first process 1502 is re-defined. The function may ensure that the seconds within the same week are on the same partition, which may provide the Disjoint property, even after the two mapper functions convert seconds to days and weeks, respectively. Additionally, since the time conversion function may be increasing, LSorted may be preserved and the local-sort operations in the second process 1504 and third process 1506 may be eliminated. Together, the optimization may eliminate two shuffling stages, and may ensure PSorted property before each reducer function in the three processes.

One illustrative embodiment may relate to query-anchor relevance. For example, search queries and anchors may be two term sets that may be bridged by URLs. Analyzing the joined data set may allow for the improvement of the search quality. If a query happens to result in a URL that an anchor points to, then the query and the anchor may very likely be relevant. For instance, if the word "China" appears frequently in query with result URL example.org/a.html, and the word "Emerging Market" appears in the anchor that points the same example.org/a.html, then "China" and "Emerging Market" may be relevant. Furthermore, if these two words appear in example.org many times and their pointing to URLs also overlap frequently, they may have a higher relevance.

Figure 16A:
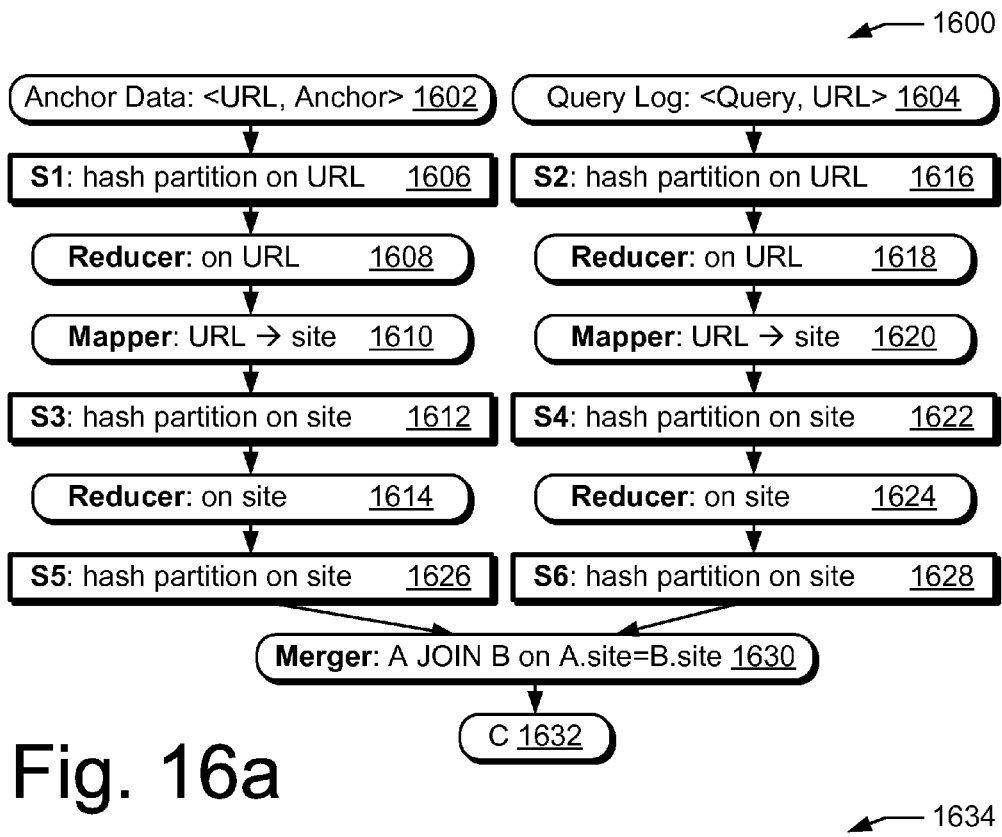
FIGS. 16a-b show an illustrative example of an original plan and an optimized plan of an aggregation and correlation process.
Figure 16B:
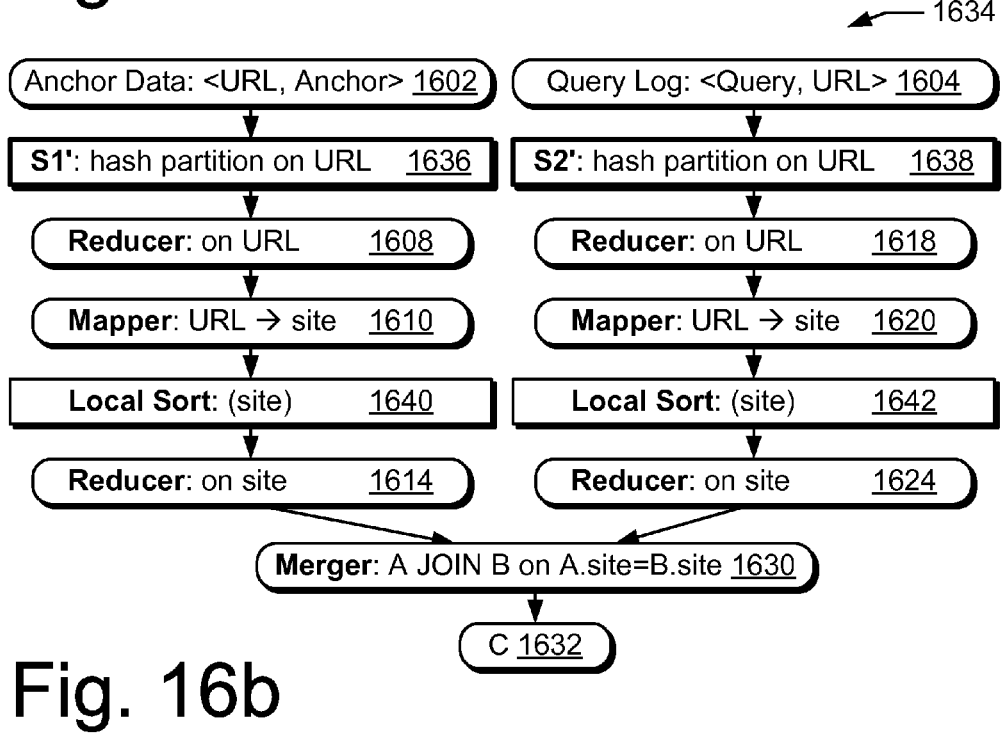

FIGS. 16*a-b* show an illustrative example of an original plan and an optimized plan of an aggregation and correlation process. For example, FIG. 16*a* shows an illustrative process 1600 that may aggregate anchor data 1602 as well as query logs 1604, correlate them via sites, and apply some learning models for relevance study (not shown). The process may first group anchor texts 1602 on URL at S1 1606, and reduce that at 1608 into {url, map {term, frequency}}, where term may be a keyword inside anchor texts and frequency may be the number of times that the term occurred in these anchors. The process may convert URLs to sites using a mapper at 1610, and group the records on the same sites at S3 1612. The reducer, at 1614, may compute an aggregated frequency for each term based on the data for different URLs (within the same site). The process may apply a similar algorithm to the query logs 1604, at for example, at 1616, 1618, 1620, 1622, and 1624. The illustrative process 1600 may join these two output datasets on site for further study with two shuffling stages S5 1626 and S6 1628, where they are merged at 1630 to result in data C 1632. Although any number of shuffling stages may be utilized, in this example, there are a total of six shuffling stages (S1-S6 1606, 1612, 1616, 1622, 1626, and 1628) in the process 1600. The illustrative implemented embodiment applied its optimization and identified a valid plan 1634 where the six shuffling stages are merged into two shuffling stages S1' 1636 and S2' 1638, as shown in FIG. 16*b*. In this example, the new shuffling stages S1' 1636 and S2' 1638 partition the input data according to the sites they belong to, so as to keep the Disjoint property along the data flow. However, since the desired data-partition property for the reducer on site 1614 and 1624 is not satisfied (the mapper function which converts URL to site 1610 and 1620 may not preserve any data-partition property), the illustrative embodiment may partially eliminate stage S3 and S4 1612 and 1622 with a local-sort operation 1640 and 1642. Since the reducer on site 1614 and 1624 may not change the site key, the last two data-shuffling stages S5 1626 and S6 1628 may be eliminated as the PSorted property may be preserved.

The three illustrative embodiments discussed above with respect to FIGS. 14*a*-16*b* may increase the performance of the respective processes. For example, between the original versions and the optimized ones a read I/O reduction may be realized.

Various embodiments contemplate context-sensitive and path-sensitive analysis. By being context-sensitive, an embodiment's analysis may be able to differentiate the cases where a function is invoked by different callers with different parameters. By being path-sensitive, an embodiment's analysis may take branching conditions into account. Various embodiments contemplate incorporating the value-range information to handle operators, such as MULTIPLY, whose functional properties may depend on the value ranges of the input operands.

Illustrative Computing Device and Illustrative Operational Environment

Figure 17:
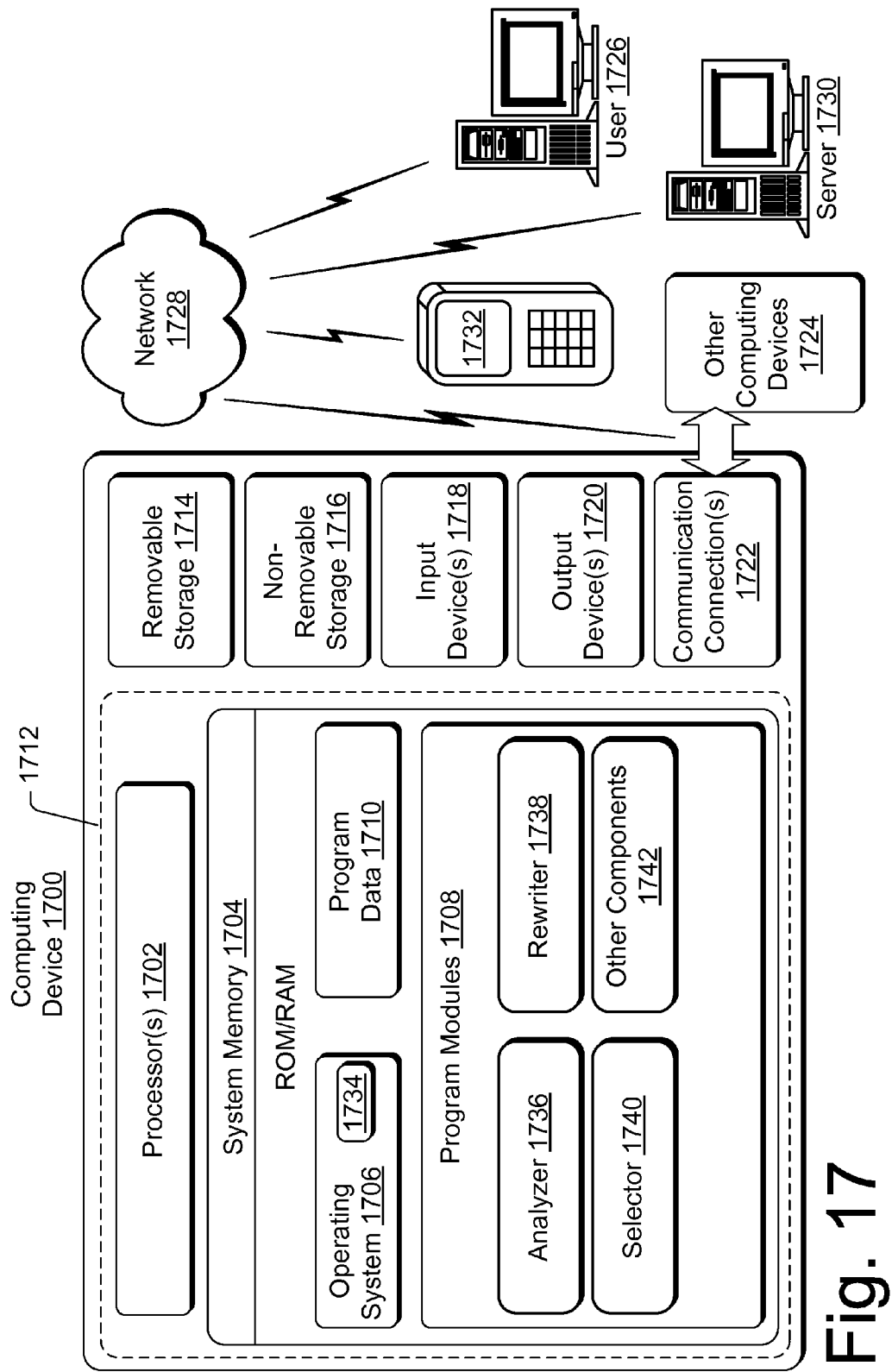
FIG. 17 shows an illustrative representative computing device and environment for performing data-parallel computation management.

FIG. 17 illustrates a representative computing device 1700 that may, but need not necessarily be used to, implement the system and methods described herein, in accordance with various embodiments. The techniques and mechanisms described herein may be implemented by multiple instances of the computing device 1700, as well as by any other computing device, system, and/or environment. The computing device 1700 shown in FIG. 17 is only one example of a computing device and is not intended to suggest any limitation as to the scope of use or functionality of any computing device utilized to perform the processes and/or procedures described above.

In at least one configuration, the computing device 1700 includes at least one processor 1702 and system memory 1704. The processor(s) 1702 may execute one or more modules and/or processes to cause the computing device 1700 to perform a variety of functions. In some embodiments, the processor(s) 1702 may include a central processing unit (CPU), a graphics processing unit (GPU), both CPU and GPU, or other processing units or components known in the art. Additionally, each of the processor(s) 1702 may possess its own local memory, which also may store program modules, program data, and/or one or more operating systems.

Depending on the exact configuration and type of the computing device 1700, the system memory 1704 may be volatile (such as RAM), non-volatile (such as ROM, flash memory, miniature hard drive, memory card, or the like) or some combination thereof. The system memory 1704 may include an operating system 1706, one or more program modules 1708, and may include program data 1710. The operating system 1706 includes a component-based framework 1734 that supports components (including properties and events), objects, inheritance, polymorphism, reflection, and provides an object-oriented component-based application programming interface (API). The computing device 1700 is of a very basic illustrative configuration demarcated by a dashed line 1712. Again, a terminal may have fewer components but may interact with a computing device that may have such a basic configuration.

Program modules 1708 may include, but are not limited to, an analyzer 1736, a rewriter 1738, a selector 1740, and/or other components 1744.

The computing device 1700 may have additional features and/or functionality. For example, the computing device 1700 may also include additional data storage devices (removable and/or non-removable) such as, for example, magnetic disks, optical disks, or tape. Such additional storage is illustrated in FIG. 17 by removable storage 1714 and non-removable storage 1716.

The storage devices and any associated computer-readable media may provide storage of computer readable instructions, data structures, program modules, and other data. Computer-readable media includes, at least, two types of computer-readable media, namely computer storage media and communication media.

Computer storage media includes volatile and non-volatile, removable and non-removable media implemented in any method or technology for storage of information such as computer readable instructions, data structures, program modules, or other data.

Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that may be used to store information for access by a computing device.

In contrast, communication media may embody computer readable instructions, data structures, program modules, or other data in a modulated data signal, such as a carrier wave, or other transmission mechanism. As defined herein, computer storage media does not include communication media.

Moreover, the computer-readable media may include computer-executable instructions that, when executed by the processor(s) 1702, perform various functions and/or operations described herein. The computing device 1700 may also have input device(s) 1718 such as a keyboard, a mouse, a pen, a voice input device, a touch input device, etc. Output device(s) 1720, such as a display, speakers, a printer, etc. may also be included.

The computing device 1700 may also contain communication connections 1722 that allow the device to communicate with other computing devices 1724, such as over a network. By way of example, and not limitation, communication media and communication connections include wired media such as a wired network or direct-wired connections, and wireless media such as acoustic, radio frequency (RF), infrared, and other wireless media. The communication connections 1722 are some examples of communication media. Communication media may typically be embodied by computer readable instructions, data structures, program modules, etc.

FIG. 17 also shows a schematic diagram of an illustrative operating environment where an illustrative system may operate. For example, various embodiments of the system may operate on the computing device 1700. The computing device 1700 may interact with a user 1726 directly or indirectly. The computing device may be connected to a network 1728. The network device 1728 may provide access to other computing devices 1724 including a server 1730, mobile devices 1732, and/or other connections and/or resources. Connections may be wired or wireless.

The illustrated computing device 1700 is only one example of a suitable device and is not intended to suggest any limitation as to the scope of use or functionality of the various embodiments described. Other well-known computing devices, systems, environments and/or configurations that may be suitable for use with the embodiments include, but are not limited to, personal computers, server computers, handheld or laptop devices, multiprocessor systems, microprocessor-based systems, set top boxes, game consoles, programmable consumer electronics, network PCs, minicomputers, mainframe computers, distributed computing environments that include any of the above systems or devices, implementations using field programmable gate arrays ("FPGAs") and application specific integrated circuits ("ASICs"), and/or the like.

The implementation and administration of a shared resource computing environment on a single computing device may enable multiple computer users to concurrently collaborate on the same computing task or share in the same computing experience without reliance on networking hardware such as, but not limited to, network interface cards, hubs, routers, servers, bridges, switches, and other components commonly associated with communications over the Internet, as well without reliance on the software applications and protocols for communication over the Internet.

Illustrative Processes

For ease of understanding, the processes discussed in this disclosure are delineated as separate operations represented as independent blocks. However, these separately delineated operations should not be construed as necessarily order dependent in their performance. The order in which the processes are described is not intended to be construed as a limitation, and any number of the described process blocks may be combined in any order to implement the process, or an alternate process. Moreover, it is also possible that one or more of the provided operations may be modified or omitted. The processes are illustrated as a collection of blocks in logical flowcharts, which represent a sequence of operations that may be implemented in hardware, software, or a combination of hardware and software. For discussion purposes, the processes are described with reference to the system shown in FIGS. 1-17. However, the processes may be performed using different architectures and devices.

Figure 18:
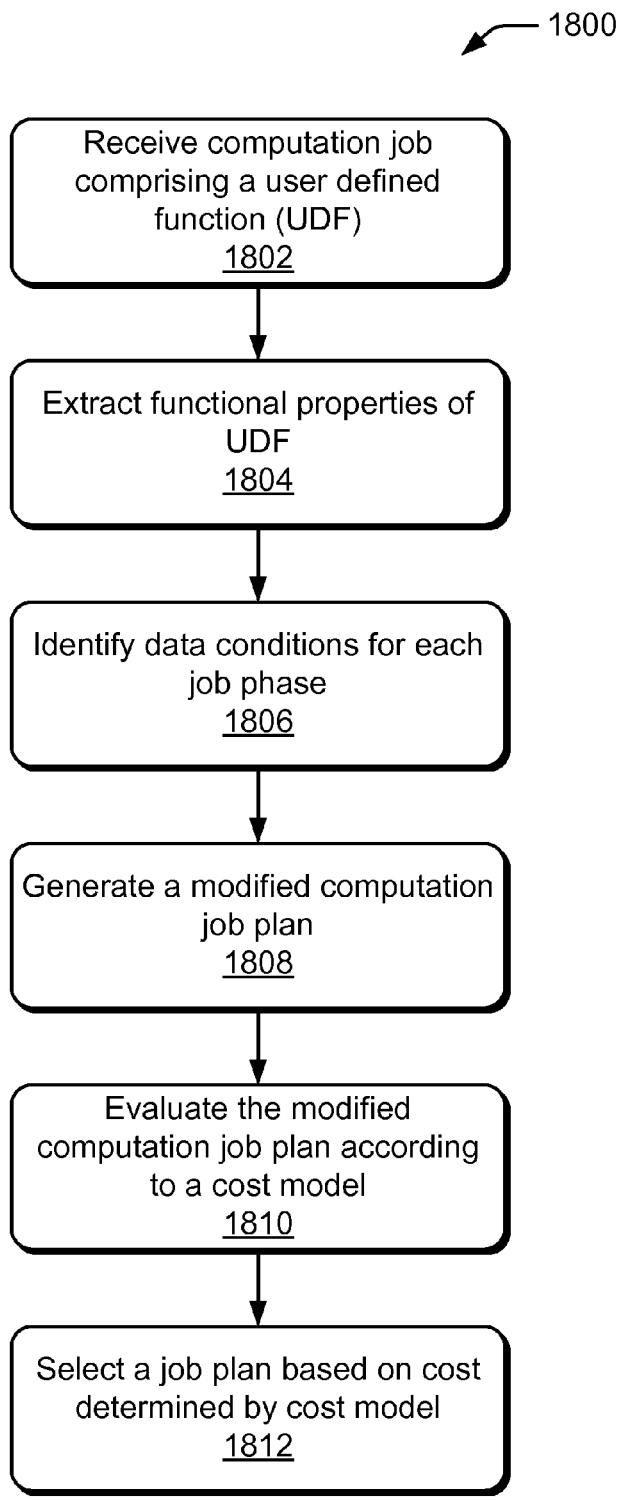
FIG. 18 is a flowchart showing an illustrative process of improving a data-parallel computation process.

FIG. 18 is a flowchart of an illustrative process 1800 of improving a data-parallel computation process. For example, at 1802 a computation process comprising one or more process phases may be received. At least one process phase may comprise one or more user defined functions (UDFs). For example, the one or more process phases may comprise one or more of a repartition by hash, repartition by range, local sort, or merge.

At 1804, functional properties of the UDFs may be extracted and determined. For example, the functional properties may comprise one or more of pass-through, one-to-one, monotonic, or strictly-monotonic.

At 1806, data conditions expected for each process phase may be identified. For example, the data conditions may comprise one or more of AdHoc, LSorted, Disjoint, Clustered, PSorted, or GSorted. Additionally or alternatively, a minimum data condition expected for each process phase may be found.

At 1808, a modified computation process plan may be generated. The modified computation process plan may improve performance over the received computation process at 1082. For example, the modified computation process plan may comprise eliminating a data-shuffling step contained in the computation process. Additionally or alternatively, the modified computation process plan may comprise a modified partition key to allow the elimination of a data-shuffling step contained in the computation process received at 1802. Additionally or alternatively, the modified computation process plan may comprise a modified partition key to allow the replacement of a data-shuffling step contained in the computation process with a step causing less computational cost than a data-shuffling step contained in the computation process received at 1802. Additionally or alternatively, a plurality of modified computation process plans may be generated as candidates to replace the computation process received at

1802. Here, heuristics may be applied to eliminate one or more candidates. For example the heuristics may be applied before a candidate is evaluated through the cost model.

At 1810, the modified computation process plan may be evaluated according to a cost model.

At 1812, a rewritten computation process may be selected from a plurality of modified computation process plans based at least in part on a respective cost set by the cost mode.

CONCLUSION

The subject matter described above can be implemented in hardware, software, or in both hardware and software. Although implementations have been described in language specific to structural features and/or methodological acts, it is to be understood that the subject matter defined in the appended claims is not necessarily limited to the specific features or acts described above. Rather, the specific features and acts are disclosed as example forms of implementing the claims. For example, the methodological acts need not be performed in the order or combinations described herein, and may be performed in any combination of one or more acts.

What is claimed is:

1. One or more computer-readable storage media storing computer-executable instructions that, when executed by one or more processors, configure the one or more processors to perform acts comprising:
   receiving a computation process comprising one or more process phases, at least one process phase comprising a first process function and a second process function, the first process function outputting data used as an input to the second process function;
   extracting and determining functional properties of the first process function and the second process function, the functional properties comprising an effect on an organizational relationship within input data and an associated organizational relationship within output data;
   analyzing the first process function and the second process function to identify output data conditions of data output from the first process function and minimum data conditions required for data input into the second process function, the data conditions comprising an organizational relationship of data within a partition and across two or more partitions;
   comparing the output data conditions with the minimum data conditions required for data input into the second process function; and
   generating a modified computation process plan based at least in part on the comparing and the functional properties of the first process function and the second process function.

2. The one or more computer-readable storage media of claim 1, further comprising evaluating the modified computation process plan according to a cost model.

3. The one or more computer-readable storage media of claim 2, further comprising selecting an optimized computation process of a plurality of modified computation process plans based at least in part on a respective cost generated by the cost model.

4. The one or more computer-readable storage media of claim 1, wherein the one or more process phases comprise one or more of a repartition by hash, repartition by range, local sort, or merge.

5. The one or more computer-readable storage media of claim 1, wherein the modified computation process plan eliminates a data-shuffling step contained in the computation process.

6. The one or more computer-readable storage media of claim 1, wherein the modified computation process plan comprises a modified partition key to allow an elimination of a data-shuffling step contained in the computation process.

7. The one or more computer-readable storage media of claim 1, wherein the modified computation process plan comprises a modified partition key to allow a replacement of a data-shuffling step contained in the computation process with a step that has less computational cost.

8. The one or more computer-readable storage media of claim 1, further comprising:
   generating a plurality of modified computation process plans as candidates; and
   applying heuristics to eliminate one or more of the candidates.

9. The one or more computer-readable storage media of claim 1, wherein the identifying data conditions associated with each process phase further comprises determining a minimum data condition associated with each process phase.

10. The one or more computer-readable storage media of claim 1, wherein the data conditions comprise one or more of AdHoc, LSorted, Disjoint, Clustered, PSorted or GSorted.

11. A system comprising:
    one or more processors;
    memory; and
    components stored on the memory and executable by the one or more processors, the components comprising:
    an analyzing module to extract functional properties of a function of a computation process, the functional properties comprising an effect on an organizational relationship within input data and an associated organizational relationship within output data; and
    a rewriter module to generate, based at least in part on the functional properties, execution plans by examining and rewriting the computation process, wherein the rewriter module is configured to perform pre-condition and post-condition analysis to identify a weakest post-condition for a data-shuffling step of the computation process and a minimum pre-condition for another data shuffling-step, the weakest post-condition comprising an organizational relationship of data within a partition and across a plurality of partitions which maintains a threshold organizational relationship, the minimum pre-condition comprising an organizational relationship of data within a partition and across a plurality of partitions that satisfies a minimum required organizational relationship for the other data shuffling step, the generating of the execution plans being based at least in part on the weakest post-condition and the minimum pre-condition.

12. The system of claim 11, wherein the components further comprise a selector module to select at least one of the execution plans based at least in part on a cost model.

13. The system of claim 11, wherein the analyzing module is configured to recognize predefined patterns in the function.

14. The system of claim 11, wherein the rewriter module is further configured to perform a property propagation analysis to identify a data property propagation through the function to satisfy the weakest post-condition for the data-shuffling step of the computation process.

15. The system of claim 11, wherein the identified weakest post-condition for the data-shuffling step comprises the weakest post-condition that maintains a threshold organizational relationship of data required for the data-shuffling step of the computation process.

16. The system of claim 11, wherein the rewriter module is further configured to generate execution plans based at least in part on the identified weakest post-condition for a data-shuffling step of the computation process.

17. A method comprising:
under control of one or more processors configured with executable instructions,
receiving a computation process comprising one or more process phases, at least one of the one or more process phases comprising a first user defined functions (UDF) and a second UDF, the first UDF outputting data used as an input to the second UDF;
extracting and determining functional properties of the first UDF and the second UDF, the functional properties comprising an effect on an organizational relationship within input data and an associated organizational relationship within output data;
analyzing output data conditions of data output from the first UDF, the data conditions comprising an organizational relationship of data within a partition and across two or more partitions;
analyzing input data conditions for the second UDF to identify minimum data conditions required for data input into the second UDF;
determining whether the output data conditions satisfy the minimum data conditions required for data input into the second UDF;
generating a modified computation process plan based at least in part on the functional properties of the first UDF, the second UDF, and the determining whether the out data conditions satisfy the minimum data conditions required, wherein the modified computation process plan comprises a modified partition key to allow an elimination of a data shuffling step contained in the computation process;
evaluating the modified computation process plan according to a cost model; and
selecting a rewritten computation process of a plurality of modified computation process plans based at least in part on a respective cost set by the cost model.

18. The method of claim 17, wherein the identifying data conditions associated with each process phase further comprises determining a minimum data condition associated with each of the one or more process phases.

19. The method of claim 17, wherein the one or more UDFs comprises at least one of pass-through, strictly-monotonic, monotonic, or one-to-one.

* * * * *